(12) United States Patent
Nammi et al.

(10) Patent No.: US 11,956,762 B2
(45) Date of Patent: Apr. 9, 2024

(54) FACILITATING IMPROVED PERFORMANCE IN ADVANCED NETWORKS WITH MULTIPLE TRANSMISSION POINTS

(71) Applicant: AT&T Intellectual Property I, L.P., Atlanta, GA (US)

(72) Inventors: SaiRamesh Nammi, Austin, TX (US); Arunabha Ghosh, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/440,865

(22) Filed: Jun. 13, 2019

(65) Prior Publication Data

US 2020/0107307 A1 Apr. 2, 2020

Related U.S. Application Data

(60) Provisional application No. 62/738,597, filed on Sep. 28, 2018.

(51) Int. Cl.
*H04W 72/044* (2023.01)
*H04L 5/00* (2006.01)
*H04W 84/04* (2009.01)

(52) U.S. Cl.
CPC ......... *H04W 72/044* (2013.01); *H04L 5/0048* (2013.01); *H04W 84/042* (2013.01)

(58) Field of Classification Search
CPC ............. H04W 72/044; H04W 84/042; H04W 28/0808; H04W 28/0812; H04W 28/0815;
(Continued)

(56) References Cited

U.S. PATENT DOCUMENTS 7,860,042 B2 12/2010 Kim et al.
8,917,690 B2 12/2014 Koivisto et al.
(Continued)

FOREIGN PATENT DOCUMENTS

EP 3 445 116 A1 2/2019
JP 2016-506690 A 3/2016
(Continued)

OTHER PUBLICATIONS

International Search Report and Written Opinion received for PCT Application Serial No. PCT/2019/047581 dated Feb. 20, 2020, 18 pages.
(Continued)

*Primary Examiner* — Un C Cho
*Assistant Examiner* — Lalita W Pace
(74) *Attorney, Agent, or Firm* — Guntin & Gust, PLC; Matthew Tropper

(57) ABSTRACT

Facilitating improved performance in advanced networks (e.g., 4G, 5G, and beyond) with multiple transmission points is provided herein. Operations of a system can comprise determining respective port numbers for respective ranks of a first transmission to a user equipment device. The operations also can comprise receiving an indication, from a second network device, of a first demodulation reference signal associated with a port number for a rank of a second transmission to the user equipment device from the second network device. Further, the operations can comprise facilitating a conveyance of the first transmission to the user equipment device. The first transmission can comprise a second demodulation reference signal on a different port number than the port number associated with the second transmission.

20 Claims, 13 Drawing Sheets

(58) Field of Classification Search
CPC ......... H04W 28/0819; H04W 28/0823; H04W 36/0069; H04L 5/0048; H04L 5/0064; H04L 5/001; H04L 5/0023; H04L 5/0091; H04L 5/0051; H04L 5/0035; H04L 2012/568; H04L 47/125; H04L 47/726; H04B 7/04

See application file for complete search history.

(56) References Cited

U.S. PATENT DOCUMENTS

| | | | |
|---|---|---|---|
| 9,148,818 | B2 | 9/2015 | Yue et al. |
| 9,264,204 | B2 | 2/2016 | Seo et al. |
| 9,369,897 | B2 | 6/2016 | Nagata et al. |
| 9,450,718 | B2 | 9/2016 | Wang et al. |
| 9,742,546 | B2 | 8/2017 | Seo et al. |
| 9,781,623 | B2 | 10/2017 | Seo et al. |
| 9,819,455 | B2 | 11/2017 | Palanki et al. |
| 9,838,175 | B2 | 12/2017 | Kim et al. |
| 9,843,942 | B2 | 12/2017 | Cheng et al. |
| 9,900,849 | B2 | 2/2018 | Xu et al. |
| 10,003,391 | B2 | 6/2018 | Liang |
| 2013/0040578 | A1* | 2/2013 | Khoshnevis ........ H04W 52/242 455/67.11 |
| 2014/0192734 | A1* | 7/2014 | Ng .................. H04L 5/0035 370/329 |
| 2014/0243002 | A1* | 8/2014 | Muruganathan .. H04W 72/0426 455/450 |
| 2014/0307648 | A1 | 10/2014 | Nagata et al. |
| 2015/0009914 | A1* | 1/2015 | Chen .................. H04W 52/248 370/329 |
| 2015/0146559 | A1* | 5/2015 | Yamada ............... H04L 5/0023 370/252 |
| 2015/0208388 | A1 | 7/2015 | Chen et al. |
| 2015/0281973 | A1* | 10/2015 | Svedman ............... H04B 7/04 455/454 |
| 2016/0218840 | A1 | 7/2016 | Li et al. |
| 2018/0234277 | A1* | 8/2018 | Akkarakaran ........ H04L 5/0035 |
| 2018/0269939 | A1 | 9/2018 | Hu et al. |
| 2019/0036570 | A1* | 1/2019 | Deng ................ H04W 72/0426 |
| 2019/0124631 | A1* | 4/2019 | Ren .................. H04W 72/0466 |
| 2020/0022172 | A1* | 1/2020 | Sun ..................... H04L 1/0003 |
| 2020/0076553 | A1* | 3/2020 | Wang ................... H04B 7/0413 |
| 2020/0084788 | A1* | 3/2020 | Li ........................ H04L 5/0051 |
| 2021/0219327 | A1* | 7/2021 | Jiang ................... H04L 1/1819 |

FOREIGN PATENT DOCUMENTS

| | | | |
|---|---|---|---|
| WO | 2010124554 A1 | 11/2010 | |
| WO | 2015135598 A1 | 9/2015 | |
| WO | WO-2017049448 A1 * | 3/2017 | ........... H04W 28/20 |
| WO | 2017173037 A1 | 10/2017 | |
| WO | 2018/001113 A1 | 1/2018 | |
| WO | 2018036508 A1 | 3/2018 | |
| WO | 2018067050 A1 | 4/2018 | |
| WO | 2018141246 A1 | 8/2018 | |

OTHER PUBLICATIONS

Gorcin, et al., "Hybrid automatic neighbor relations for 5G wireless networks." Wireless Communication Systems (ISWCS), 2017 International Symposium, IEEE, 2017.

Wu, et al., "Centralized and distributed schedulers for noncoherent joint transmission." arXiv preprint arXiv:1809.03414 (2018). https://arxiv.org/pdf/1809.03414.pdf.

Lagen, et al., "New Radio beam-based Access to Unlicensed Spectrum: Design Challenges and Solutions." arXiv preprint arXiv:1809.10443 (2018). https://arxiv.org/pdf/1809.10443.pdf.

International Preliminary Report on Patentability received for PCT Application Serial No. PCT/US2019/047581 dated Apr. 8, 2021, 12 pages.

Office Action received for Indian Patent Application Serial No. 202147012675 dated Feb. 3, 2022, 6 pages.

Notice of Reasons for Refusal received for Japanese Patent Application Serial No. 2021-517279 dated May 26, 2022, 14 pages.

Notice of Reasons for Refusal received for Japanese Patent Application Serial No. 2021-517279 dated Dec. 13, 2022, 6 pages ( Including English Translation).

Communication Pursuant to Rules Article 94(3) EPC received for EP Patent Application Serial No. 19 762 638.5 dated Dec. 14, 2022, 3 pages.

* cited by examiner

FACILITATING IMPROVED PERFORMANCE IN ADVANCED NETWORKS WITH MULTIPLE TRANSMISSION POINTS

CROSS-REFERENCE TO RELATED APPLICATIONS

This application claims the benefit of U.S. Provisional Application Ser. No. 62/738,597, filed Sep. 28, 2018, and entitled "IMPROVED PERFORMANCE IN 5G WIRELESS COMMUNICATIONS SYSTEMS WITH MULTIPLE TRANSMISSION POINTS," the entirety of which is expressly incorporated herein by reference.

TECHNICAL FIELD

This disclosure relates generally to the field of mobile communication and, more specifically, to allocating frequency and/or time domain resources in wireless communication systems for advanced networks (e.g., 4G, 5G, and beyond) that comprise multiple transmission points.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G, or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
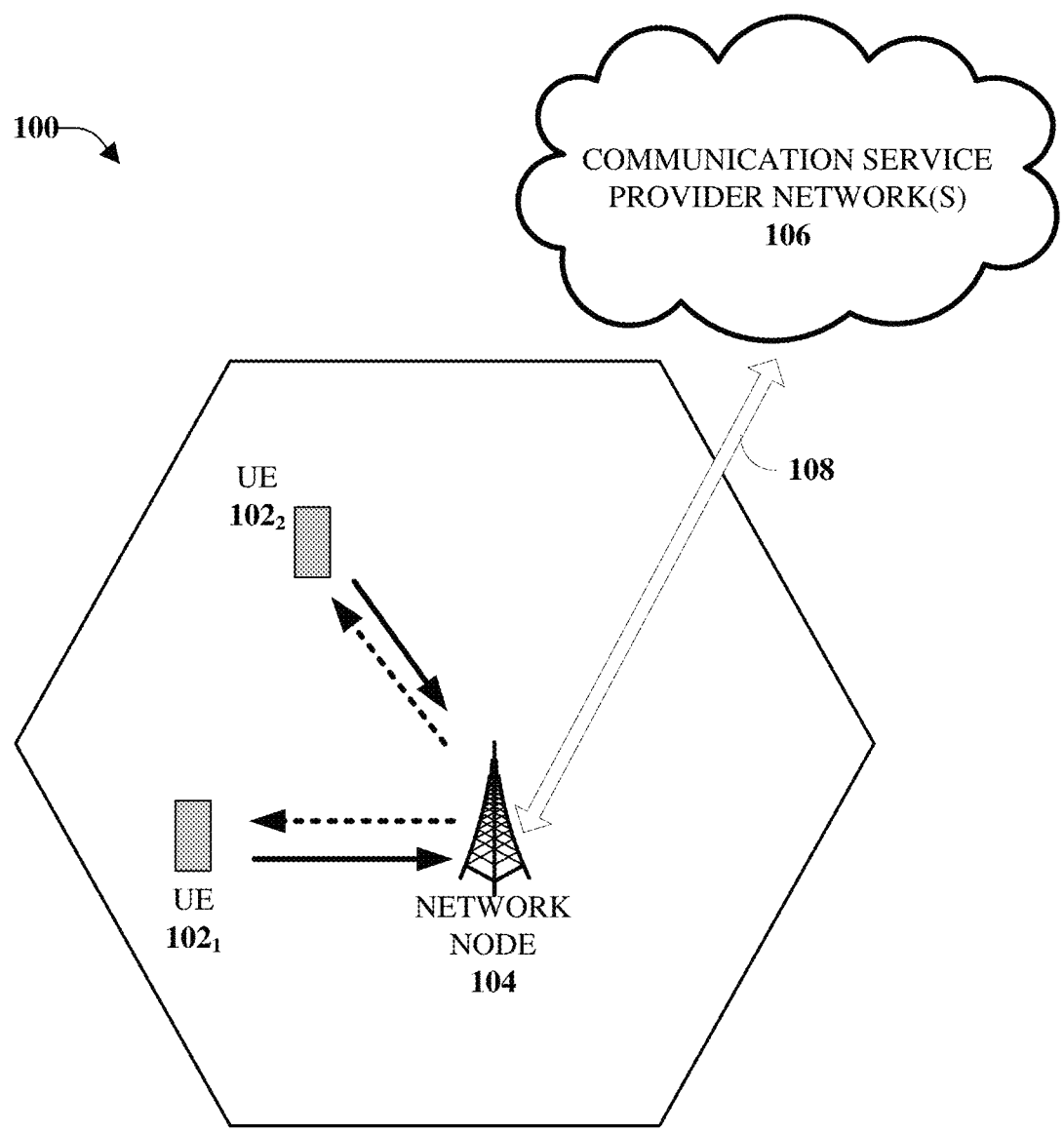
FIG. 1 illustrates an example, non-limiting, wireless communication system in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Described herein are systems, methods, articles of manufacture, and other embodiments or implementations that can facilitate improved performance in advanced networks with multiple transmission points. More specifically described herein are aspects related to wireless communication systems and related to coordinating reference signals to reduce interference in advanced networks.

To meet the huge demand for data centric applications, 4G standards can be applied to 5G, also called New Radio (NR) access. 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to Long Term Evolution (LTE).

Multiple Input, Multiple Output (MIMO) systems can significantly increase the data carrying capacity of wireless systems. For these reasons, MIMO is an integral part of the third and fourth generation wireless systems (e.g., 3G and 4G). In addition, 5G systems also employ MIMO systems, which are referred to as massive MIMO systems (e.g., hundreds of antennas at the transmitter side (e.g., network) and/receiver side (e.g., user equipment). With a $(N_t,N_r)$ system, where $N_t$ denotes the number of transmit antennas and Nr denotes the receive antennas, the peak data rate multiplies with a factor of $N_t$ over single antenna systems in rich scattering environment.

According to an embodiment, provided is a system the can comprise a processor and a memory that stores executable instructions that, when executed by the processor, facilitate performance of operations. The operations can comprise determining respective port numbers for respective ranks of a first transmission to a user equipment device. The operations also can comprise receiving an indication, from a second network device, of a first demodulation reference signal associated with a port number for a rank of a second transmission to the user equipment device from the second network device. Further, the operations can comprise facilitating a conveyance of the first transmission to the user equipment device. The first transmission can comprise a second demodulation reference signal on a different port number than the port number associated with the second transmission.

According to some implementations, receiving the indication can comprise receiving the indication via an X2 communication protocol. In some implementations, the second demodulation reference signal can be selected not to interfere with the first demodulation reference signal. The operations can comprise, according to some implementations, transmitting information indicative of the respective port numbers for the respective ranks of the first transmission to the second network device. In an example, the first demodulation reference signal can be located in different resource elements than the second demodulation reference signal.

In accordance with some implementations, the indication from the second network device can comprise information related to a first traffic load of the second network device. Further to these implementations, the operations can comprise scheduling the second demodulation reference signal on the port number based on a difference between the first traffic load of the second network device and a second traffic load of the first network device.

According to some implementations, the indication from the second network device can comprise information related to a first group of resource elements associated with a first channel state information reference signal of the second network device. Further to these implementations, the operations can comprise configuring a second channel state information reference signal to have zero power at a second group of resource elements that correspond to the first group of resource elements.

The indication from the second network device can comprise information related to a first group of resource elements associated with a first phase tracking reference signal of the second network device. Further to this implementation, the operations can comprise configuring a channel state information reference signal to have zero power at a second group of resource elements that correspond to the first group of resource elements.

Further, facilitating the conveyance of the first transmission to the user equipment device can comprise facilitating the conveyance of the first transmission via a downlink channel configured to operate according to a fifth generation wireless network communication protocol.

Another embodiment can relate to a method that can comprise determining, by a first network device of a group of network devices in a communication network, respective port numbers for ranks of a group of ranks, wherein the first network device comprises a processor. The method also can comprise receiving, by the first network device, information indicative of respective demodulation reference signal ports for the ranks of the group of ranks, wherein the information is received from a second network device. Further, the method can comprise transmitting, by the first network device, data to a mobile device based on the mobile device being scheduled with the respective port numbers.

According to some implementations, the method can comprise sending, by the first network device, an indication of the respective port numbers for the ranks of the group of ranks to the second network device. Determining the respective port numbers can comprise partitioning available ports into two groups of ports.

The method can comprise, according to some implementations, performing, by the first network device, semi-static coordination with transmissions of the second network device. Further to these implementations, the method can comprise reducing, by the first network device, interference on demodulation reference signals based on performing the semi-static coordination.

In accordance with some implementations, the method can comprise reserving, by the first network device, resource elements of the respective demodulation reference signal ports for use by the second network device. Further to these implementations, the first network device can avoid scheduling data transmissions on the resource elements of the respective demodulation reference signal port.

The method can comprise, according to some implementations, scheduling, by the first network device, the mobile device with the respective port numbers for the ranks of the group of ranks. In some implementations, transmitting the data can comprise transmitting the data via a downlink channel configured to operate according to a fifth generation wireless network communication protocol.

Another embodiment can relate to a machine-readable storage medium, comprising executable instructions that, when executed by a processor, facilitate performance of operations. The operations can comprise determining respective port numbers for respective ranks of a first transmission to a mobile device. Also, the operations can comprise receiving an indication, from a second network device, of a first demodulation reference signal associated with a port number for a rank of a second transmission to the mobile device, wherein the indication is received from a network device. Further, the operations can comprise sending the first transmission to the mobile device. The first transmission can comprise a second demodulation reference signal on a different port number than the port number associated with the second transmission.

The second demodulation reference signal can be selected to avoid interference with the first demodulation reference signal. Further, the first demodulation reference signal can be located in different resource elements than the second demodulation reference signal.

Referring now to FIG. 1, illustrated is an example, non-limiting, wireless communication system 100 in accordance with one or more embodiments described herein. According to various embodiments, the wireless communication system 100 can comprise one or more User Equipment devices (UEs), illustrated as a first UE $102_1$ and a second UE $102_2$. It is noted that although only two UEs are illustrated for purposes of simplicity, the wireless communication system 100 can comprise a multitude of UEs.

The non-limiting term user equipment can refer to any type of device that can communicate with a network node in a cellular or mobile communication system. A UE can comprise one or more antenna panels having vertical and horizontal elements. UEs can be any user equipment device, such as a mobile phone, a smartphone, a cellular enabled laptop (e.g., comprising a broadband adapter), a tablet computer, a wearable device, a virtual reality (VR) device, a heads-up display (HUD) device, a smart car, a machine-type communication (MTC) device, and the like. Other examples of UEs comprise, but are not limited to, a target device, device to device (D2D), machine type UE or UE capable of machine to machine (M2M) communications, personal digital assistant (PDA), tablet, mobile terminals, laptop mounted equipment (LME), universal serial bus (USB) dongles enabled for mobile communications, a computer having mobile capabilities, a mobile device such as cellular phone, a laptop having laptop embedded equipment (LEE), such as a mobile broadband adapter, a tablet computer having a mobile broadband adapter, and the like. User equipment (e.g., the first UE $102_1$, the second UE $102_2$) can also comprise Internet of Things (IOT) devices that can communicate wirelessly. UEs can roughly correspond to the mobile station (MS) in Global System for Mobile communications (GSM) systems.

In various embodiments, the wireless communication system 100 is, or can comprise, a wireless communication network serviced by one or more wireless communication network providers. In example embodiments, a UE (e.g., the first UE $102_1$, the second UE $102_2$) can be communicatively coupled to the wireless communication network via a network node device 104. The network node (e.g., network node device) can communicate with the UEs, thus providing connectivity between the UEs and the wider cellular network. Further, the network node device 104 can facilitate wireless communication between the UEs and the wireless communication network (e.g., one or more communication service provider networks 106) via the network node device 104. In example embodiments, the UEs (e.g., the first UE $102_1$, the second UE $102_2$) can send and/or receive communication data via a wireless link to the network node device 104. The dashed arrow lines from the network node device 104 to the UEs (e.g., the first UE $102_1$, the second UE $102_2$) represent downlink (DL) communications and the solid arrow lines from the UE (e.g., the first UE $102_1$, the second UE $102_2$) to the network nodes (e.g., the network node device 104) represents uplink (UL) communications.

The wireless communication system 100 can further comprise one or more communication service provider networks 106 that can facilitate providing wireless communication services to various UEs, (e.g., the first UE $102_1$, the second UE $102_2$), via the network node device 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks, Wi-Fi service networks, broadband service networks, enterprise networks, cloud based networks, and the like.

The non-limiting term network node (e.g., network node device) can be used herein to refer to any type of network node serving one or more UEs and/or connected to other network nodes, network elements, other nodes, and/or other devices from which one or more UEs can receive a radio signal. In cellular radio access networks (e.g., Universal Mobile Telecommunications System (UMTS) networks), a network node can be referred to as Base Transceiver Stations (BTS), radio base station, radio network nodes, base stations, Node B, eNode B (e.g., evolved Node B), and so on. In 5G terminology, the node can be referred to as a gNode B (e.g., gNB) device.

Network nodes can also comprise multiple antennas for performing various transmission operations (e.g., Multiple Input, Multiple Output (MIMO) operations). A network node can comprise a cabinet and other protected enclosures, an antenna mast, and actual antennas. Network nodes can serve several cells, also called sectors, depending on the configuration and type of antenna. Examples of network nodes (e.g., network node device 104) can comprise but are not limited to: Node B devices, Base Station (BS) devices, Access Point (AP) devices, and Radio Access Network (RAN) devices. The network node device 104 can also comprise Multi-Standard Radio (MSR) radio node devices, comprising: an MSR BS, an eNode B, a network controller, a Radio Network Controller (RNC), a Base Station Controller (BSC), a relay, a donor node controlling relay, a Base Transceiver Station (BTS), a transmission point, a transmission node, a Remote Radio Unit (RRU), a Remote Radio Head (RRH), nodes in distributed antenna system (DAS), and the like.

For example, in at least one implementation, the wireless communication system 100 can be, or can include, a large scale wireless communication network that spans various geographic areas. According to this implementation, the one or more communication service provider networks 106 can be, or can include, the wireless communication network and/or various additional devices and components of the wireless communication network (e.g., additional network devices and cell, additional UEs, network server devices, etc.).

The network node device 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also comprise wireless link components, such as but not limited to, line-of-sight (LOS) or non-LOS links which can include terrestrial air-interfaces or deep space links (e.g., satellite communication links for navigation).

The wireless communication system 100 can employ various cellular systems, technologies, and modulation modes to facilitate wireless radio communications between devices (e.g., the UEs (e.g., the first UE $102_1$, the second UE $102_2$) and the network node device 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000, and so on.

For example, the wireless communication system 100 can operate in accordance with Global System for Mobile Communications (GSM), Universal Mobile Telecommunications Service (UMTS), Long Term Evolution (LTE), LTE frequency division duplexing (LTE FDD), LTE Time Division Duplexing (TDD), High Speed Packet Access (HSPA), Code Division Multiple Access (CDMA), Wideband CDMA (WCMDA), CDMA2000, Time Division Multiple Access (TDMA), Frequency Division Multiple Access (FDMA), Multi-Carrier Code Division Multiple Access (MC-CDMA), Single-Carrier Code Division Multiple Access (SC-CDMA), Single-Carrier FDMA (SC-FDMA), Orthogonal Frequency Division Multiplexing (OFDM), Discrete Fourier Transform Spread OFDM (DFT-spread OFDM) Single Carrier FDMA (SC-FDMA), Filter Bank Based Multi-Carrier (FBMC), Zero Tail DFT-spread-OFDM (ZT DFT-s-OFDM), Generalized Frequency Division Multiplexing (GFDM), Fixed Mobile Convergence (FMC), Universal Fixed Mobile Convergence (UFMC), Unique Word OFDM (UW-OFDM), Unique Word DFT-spread OFDM (UW DFT-Spread- OFDM), Cyclic Prefix OFDM CP-OFDM, resource-block-filtered OFDM, Wi Fi, WLAN, WiMax, and the like.

However, various features and functionalities of the wireless communication system 100 are particularly described wherein the devices (e.g., the UEs (e.g., the first UE $102_1$, the second UE $102_2$) and the network node device 104) of the wireless communication system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to MultiCarrier (MC) or Carrier Aggregation (CA) operation of the UE. The term carrier aggregation is also called (e.g. interchangeably called) "multi-carrier system," "multi-cell operation," "multi-carrier operation," "multi-carrier" transmission and/or reception. Note that some embodiments are also applicable for Multi RAB (radio bearers) on some carriers (that is data plus speech is simultaneously scheduled).

In various embodiments, the wireless communication system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs).

Figure 2:
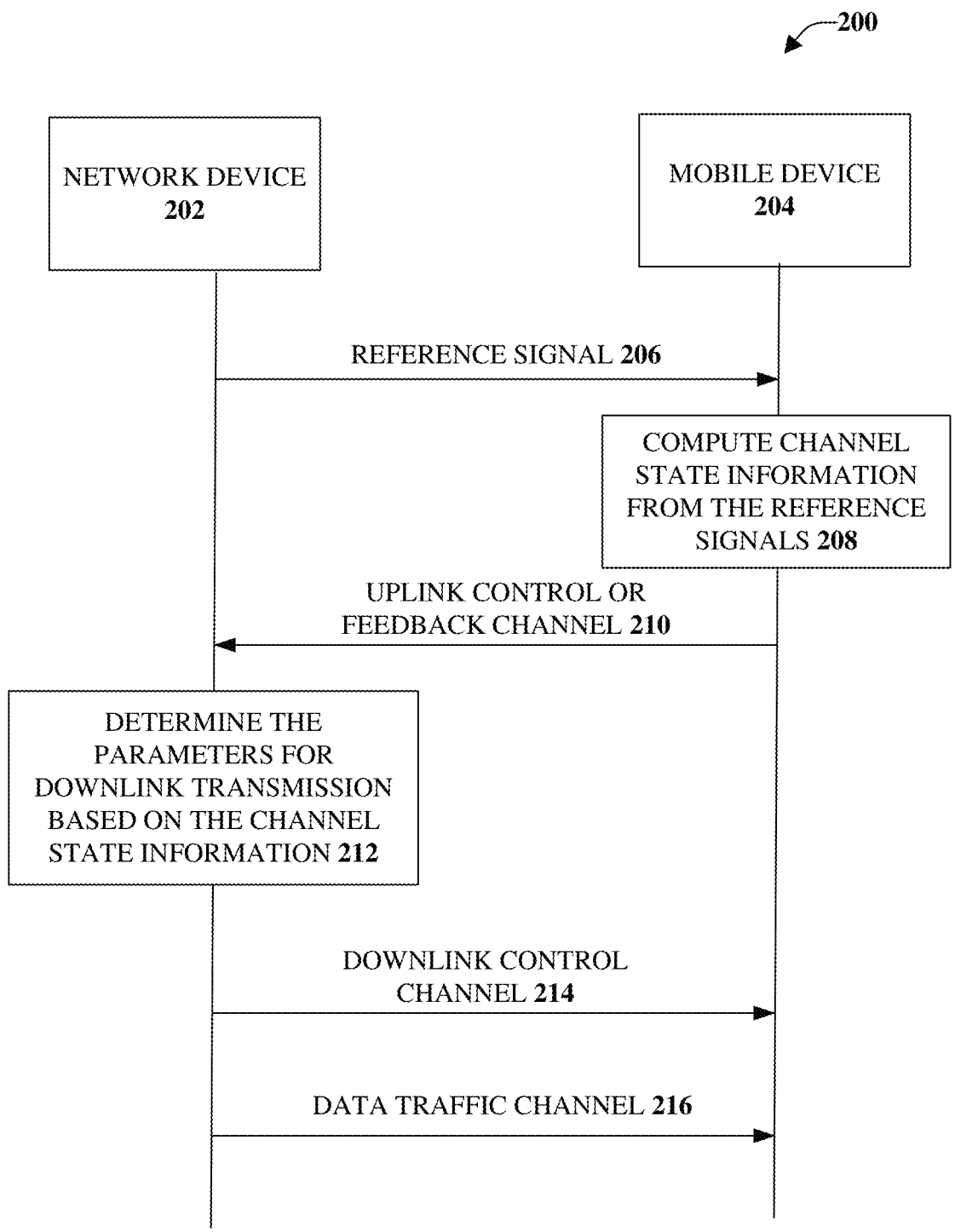
FIG. 2 illustrates an example, non-limiting, message sequence flow chart that can facilitate downlink data transfer in accordance with one or more embodiments described herein.

FIG. 2 illustrates an example, non-limiting, message sequence flow chart 200 that can facilitate downlink data transfer in accordance with one or more embodiments described herein. The message sequence flow chart 200 can be utilized for new radio, as discussed herein. As illustrated, the message sequence flow chart 200 represents the message sequence between a network device 202 (e.g., a General Node B, base station (gNB)) and a mobile device 204. As used herein, the term "network device 202" can be interchangeable with (or include) a network, a network controller or any number of other network components. One or more pilot signals and/or reference signals 206 can be transmitted from the network device 202 to the mobile device 204. The one or more pilot signals and/or reference signals 206 can be cell specific and/or user equipment specific signals. The one or more pilot signals and/or reference signals 206 can be beamformed or non-beamformed.

Based on the one or more pilot signals and/or reference signals 206, the mobile device 204 can compute the channel estimates and can compute the one or more parameters needed for channel state information (CSI) reporting, as indicated at 208. The CSI report can comprise, for example, channel quality indicator (CQI), preceding matrix index (PMI), rank information (RI), Channel State Information Reference Signal (CSI-RS) Resource Indicator (CRI the same as beam indicator), and so on, or any number of other types of information.

The CSI report can be sent from the mobile device 204 to the network device 202 via a feedback channel (e.g., uplink control or feedback channel 210). The CSI report can be sent on request from the network device 202, a-periodically, and/or the mobile device 204 can be configured to report periodically.

The network device 202, which can comprise a scheduler, can use the CSI report for determining the parameters for scheduling of the particular mobile device 204. For example, as indicated at 212, the network device 202 can determine the parameters for downlink transmission based on the channel state information. The parameters for downlink transmission can include but are not limited to: Modulation and Coding Scheme (MCS), power, Physical Resource Blocks (PRBs), and so on.

The network device 202 can send the scheduling parameters to the mobile device 204 in a downlink control channel (e.g., downlink control channel 214). Upon or after the scheduling parameter information is transmitted, the actual data transfer can take place from the network device 202 to the mobile device 204 over the data traffic channel 216.

Downlink reference signals are predefined signals occupying specific resource elements within the downlink time-frequency grid. There are several types of downlink reference signals that are transmitted in different ways and used for different purposes by the receiving terminal (e.g., the mobile device 204). For example, downlink reference signals can include CSI reference signals (CSI-RS) and demodulation reference signals (DM-RS).

CSI reference signals are specifically intended to be used by terminals (e.g., the mobile device 204) to acquire channel-state information (CSI) and beam specific information (beam RSRP). In 5G, CSI-RS is mobile device specific. Therefore, the CSI-RS can have a significantly lower time/frequency density.

Demodulation reference signals (also sometimes referred to as User Equipment (UE)-specific reference signals), are specifically intended to be used by terminals for channel estimation for data channel. The label "UE-specific" relates to the fact that each demodulation reference signal is intended for channel estimation by a single terminal. That specific reference signal is then only transmitted within the resource blocks assigned for data traffic channel transmission to that terminal.

Downlink reference signals can also include Phase Tracking Reference Signals (PT-RS) and Tracking Reference Signals (TRS). Other than the above-mentioned reference signals, there are other reference signals, namely phase tracking and tracking and sounding reference signals, which can be used for various purposes.

An uplink control channel carries information about Hybrid Automatic Repeat Request (HARQ-ACK) information corresponding to the downlink data transmission, and channel state information. The channel state information can comprise CSI-RS Resource Indicator (CRI), Rank Indicator (RI), Channel Quality Indicator (CQI), Precoding Matrix Indicator (PMI), Layer Indicator, and so on. The CSI can be divided into at least two categories. For example, a first category can be for subband and a second category can be for wideband. The configuration of subband and/or wideband CSI reporting can be performed through Radio Resource Control (RRC) signaling as part of CSI reporting configuration. Table 1 below illustrates example contents of an example CSI report for both wideband and subband. Specifically, Table 1 illustrates the contents of a report for PMI format indicator=Wideband, CQI format indicator=wideband and for PMI format indicator=subband, CQI format indicator=subband.

TABLE 1

| PMI-FormatIndicator = widebandPMI and CQI-FormatIndicator = widebandCQI | PMI-FormatIndicator = subbandPMI or CQI-FormatIndicator = subbandCQI | | |
|---|---|---|---|
| | | CSI Part II | |
| | CSI Part I | wideband | Subband |
| CRI | CRI | Wideband CQI for the second TB | Subband differential CQI for the second TB of all even subbands |
| Rank Indicator | Rank Indicator | PMI wideband (X1 and X2) | PMI subband information fields $X_2$ of all even subbands |
| Layer Indicator | Layer Indicator | — | Subband differential CQI for the second TB of all odd subbands |
| PMI wideband (X1 and X2) | Wideband CQI | — | PMI subband information fields $X_2$ of all odd subbands |
| Wideband CQI | Subband differential CQI for the first TB | — | — |

It is noted that for NR, the subband can be defined according to the bandwidth part of the Orthogonal Frequency-Division Multiplexing (OFDM) in terms of PRBs as shown in Table 2 below, which illustrates example, non-limiting, configurable subband sizes. The subband configuration can also be performed through RRC signaling.

TABLE 2

| Carrier bandwidth part (PRBs) | Subband Size (PRBs) |
|---|---|
| <24 | N/A |
| 24-72 | 4, 8 |
| 73-144 | 8, 16 |
| 145-275 | 16, 32 |

The downlink control channel (PDCCH) can carry information about the scheduling grants. This can comprise a number of MIMO layers scheduled, transport block sizes, modulation for each codeword, parameters related to HARQ, subband locations, and so on. It is noted that all Downlink Control Information (DCI) formats might not use and/or might not transmit all the information as shown above. In general, the contents of PDCCH depends on transmission mode and DCI format.

In some cases, the following information can be transmitted by means of the downlink control information (DCI) format: carrier indicator, identifier for DCI formats, bandwidth part indicator, frequency domain resource assignment, time domain resource assignment, Virtual Resource Block (VRB)-to-PRB mapping flag, PRB bundling size indicator, rate matching indicator, Zero Power (ZP) CSI-RS trigger, modulation and coding scheme for each Transport Block (TB), new data indicator for each TB, redundancy version for each TB, HARQ process number, downlink assignment index, Transmit Power Control (TPC) command for uplink control channel, Physical Uplink Control Channel (PUCCH) resource indicator, Physical Downlink Shared Channel (PDSCH)-to-HARQ feedback timing indicator, antenna port(s), transmission configuration indication, Sounding Reference Signal (SRS) request, Code Block Group (CBG) transmission information, CBG flushing out information, Demodulation Reference Signal (DMRS) sequence initialization, and so on.

Figure 3:
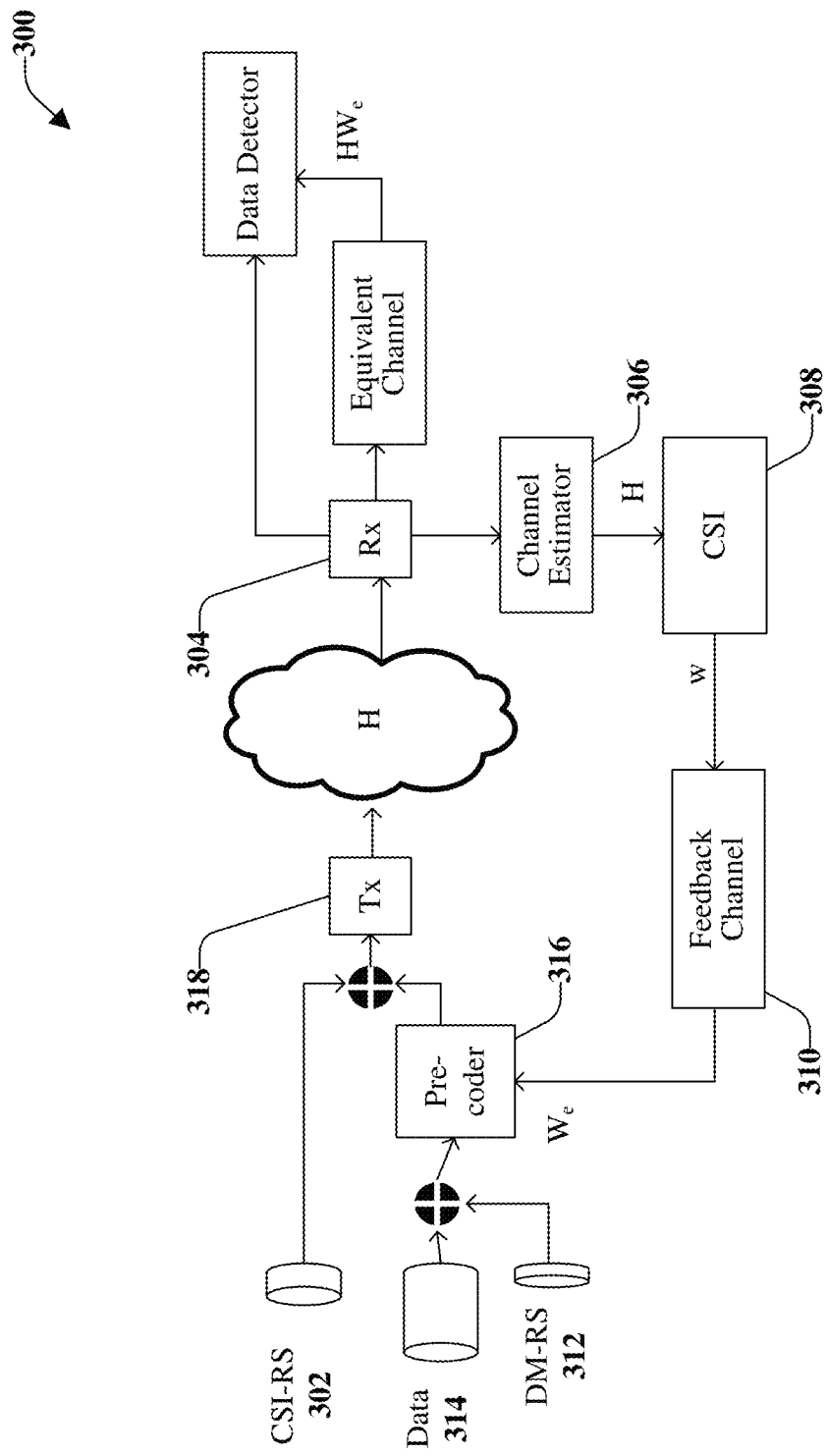
FIG. 3 illustrates an example, non-limiting, system diagram of a multiple input multiple output system with demodulation reference signals in accordance with one or more embodiments described herein.

FIG. 3 illustrates an example, non-limiting, system diagram 300 of a Multiple Input Multiple Output (MIMO) system with Demodulation Reference Signals (DM-RS) in accordance with one or more embodiments described herein. MIMO systems can significantly increase the data carrying capacity of wireless systems. MIMO can be used for achieving diversity gain, spatial multiplexing gain, and beamforming gain. For these reasons, MIMO is an integral part of 3G and 4G wireless systems. In addition, massive MIMO systems are currently under investigation for 5G systems and more advanced systems.

The system diagram 300 is an example, non-limiting conceptual diagram of a MIMO system with demodulation reference signal. At a gNode B transmitter, common reference signals, namely CSI-RS 302 are transmitted for channel sounding. The UE receiver 304 estimates channel quality (typically SINR) from channel sounding (e.g., via a channel estimator device 306), and computes the preferred precoding matrix (PMI), rank indicator (RI), and CQI for the next downlink transmission. This information is referred to as channel state information (CSI) 308. The UE conveys this information through a feedback channel 310 (e.g., the uplink control or feedback channel 210 as discussed with respect to FIG. 2).

For downlink data transmission, the gNode B uses this information and chooses the precoding matrix as suggested by the UE (or the gNodeB can choose a precoding matrix on its own, which can be other than the UE recommended PMI), CQI, and the transport block size, and so on. Finally, both the reference signal (DM-RS) 312 and the data 314 are multiplied by the precoding matrix (e.g., pre-coder device 316) selected by the gNode B and transmitted, indicated at 318. The UE receiver estimates the effective channel (e.g., the channel multiplied by the precoding matrix) and demodulates the data.

Figure 4A:
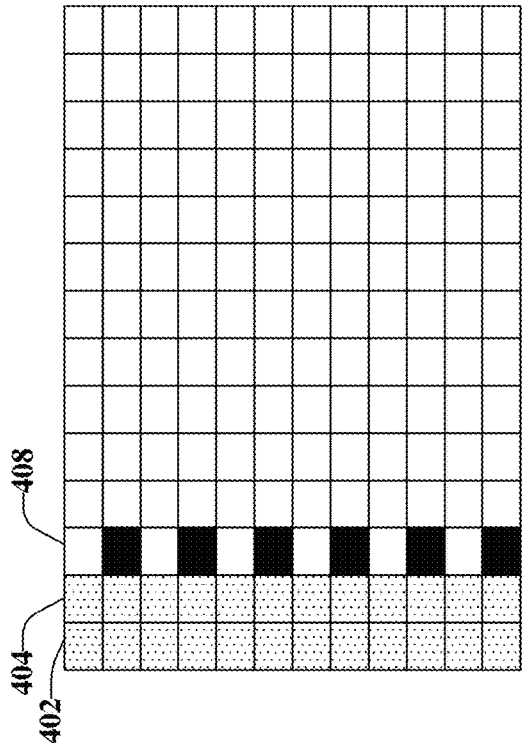
FIGS. 4A to 4D illustrate non-limiting examples of resource mapping for a demodulation reference signal structure for up to four antenna ports in accordance with one or more embodiments described herein.
Figure 4B:
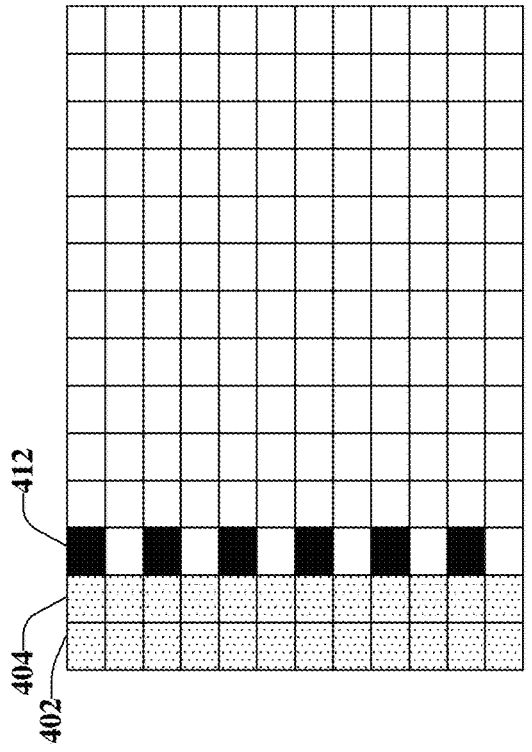
Figure 4C:
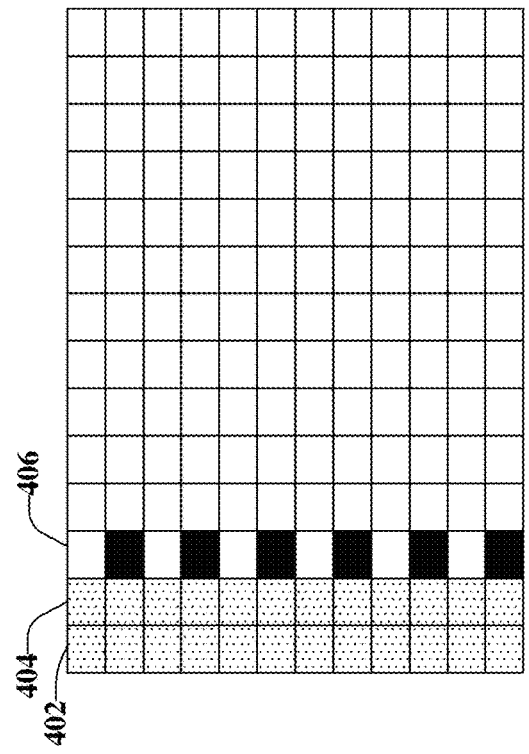
Figure 4D:
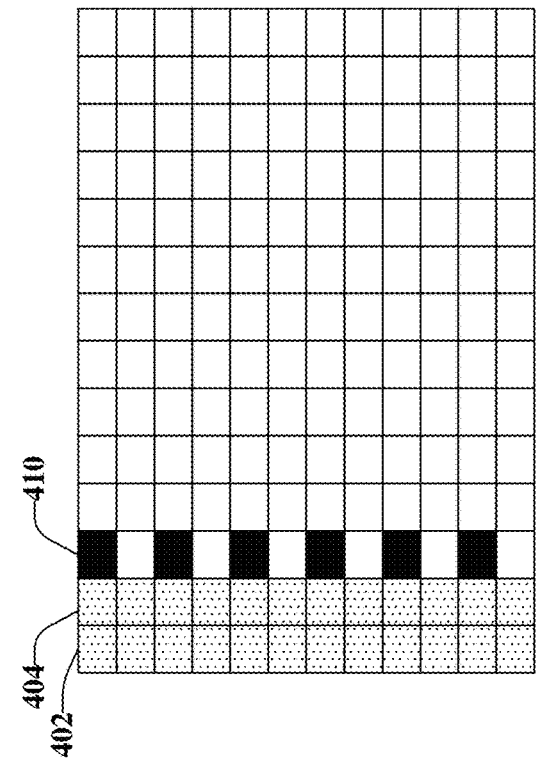

FIGS. 4A to 4D illustrate non-limiting examples of resource mapping for a Demodulation Reference Signal (DM-RS) structure for up to four antenna ports in accordance with one or more embodiments described herein. Specifically, FIG. 4A illustrates resource mapping for antenna port 0; FIG. 4B illustrates resource mapping for antenna port 1; FIG. 4C illustrates resource mapping for antenna port 2; and FIG. 4D illustrates resource mapping for antenna port 3.

As indicated, FIGS. 4A to 4D illustrate an example of DM-RS structure for four antenna ports (hence maximum four layers and four DM-RS) in a NR system. The first two OFDM symbols in FIGS. 4A-4D are control symbols (indicated by columns 402 and 404).

As illustrated in FIG. 4A, six reference symbols, indicated as the dark squares in the third OFDM symbol (e.g., indicated as third column 406) within a resource-block are transmitted for a single antenna port 0. As illustrated in FIG. 4B, the same reference symbols, indicated as the dark squares in the third OFDM symbol (indicated as the third column 408), are code multiplexed and transmitted on antenna port 1.

In a similar manner, for port 2 (FIG. 4C) and port 3 (FIG. 4D) the same resource elements are used for transmitting DMRS reference symbols. These are illustrated by the dark squares in the third column 410 of FIG. 4C and the third column 412 of FIG. 4D. However, they are code multiplexed as in port 0 (FIG. 4A) and port 1 (FIG. 4B). Note that the resource elements are used for ranks 3 and 4 (ports 2 and 3) are orthogonal in frequency to that of port 0 and port 1. The other reference symbols in FIGS. 4A to 4D can be utilized for data.

As the number of transmitted layers can vary dynamically, the number of transmitted DM-RS can also vary. The terminal (e.g., the mobile device 204, the UE) can be informed about the number of transmitted layers (or the rank) as part of the scheduling information via downlink control channel as explained with respect to FIG. 2. Table 3 below illustrated the DCI indication as a non-limiting example.

Similar to LTE, in NR the OFDM waveform can be used for both downlink and uplink transmissions. The transmit signals in an OFDM system can have high peak values in the time domain since many subcarrier components are added via an Inverse Fast Fourier Transform (IFFT) operation. Therefore, OFDM systems can have a high Peak-to-Average Power Ratio (PAPR), compared with single-carrier systems. In fact, the high PAPR is one of the most detrimental aspects in the OFDM system, as it decreases the Signal-to-Quantization Noise Ratio (SQNR) of Analog-to-Digital Converter (ADC) and Digital-to Analog Converter (DAC) while degrading the efficiency of the power amplifier in the transmitter. Table 3 below illustrates an example, non-limiting, DCI indication. More specifically, Table 3 illustrates antenna port(s) (1000+DMRS port), dmrs–Type=1, maxLength=1.

TABLE 3

| | One Codeword: Codeword 0 enabled, Codeword 1 disabled | |
| --- | --- | --- |
| Value | Number of DMRS CDM group(s) without data | DMRS port(s) |
| 0 | 1 | 0 |
| 1 | 1 | 1 |
| 2 | 1 | 0, 1 |

TABLE 3-continued

| | One Codeword: Codeword 0 enabled, Codeword 1 disabled | |
| --- | --- | --- |
| Value | Number of DMRS CDM group(s) without data | DMRS port(s) |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0.2 |
| 12-15 | Reserve | Reserved |

Generally, NR operates at higher frequency bands as compared to traditional wireless communication devices. For example, 3GPP introduced a reference signal referred to as a phase tracking reference signal. Phase tracking reference signals can be considered as an extension to DMRS intended for tracking phase variations across the transmission duration, for example, one slot. These phase variations can come from phase noise in the local oscillators, primarily at higher frequencies where the phase noise tends to be higher.

Since the main purpose is to track the phase noise, the PT-RS should be dense in time but can be sparse in frequency. The PT-RS only occurs in combination with DM-RS and only if the network configured the PT-RS to be present.

The first PT-RS reference symbol in the PDSCH allocation is repeated every Lth OFDM symbol, starting with the first OFDM symbol in the allocation. The repetition counter is reset at each DM-RS occasion as there is no need for PT-RS immediately after the DM-RS. In general, the density is linked to the scheduled MCS signaled in the downlink control channel.

In the frequency domain, phase tracking reference symbols are transmitted in every second or fourth resource block. This results in sparse frequency domain structure. The frequency domain allocation is linked to the scheduled transmission bandwidth such that the higher the bandwidth, the lower the PT-RS density in the frequency domain. For smallest bandwidths, no PT-RS is transmitted.

Figure 5:
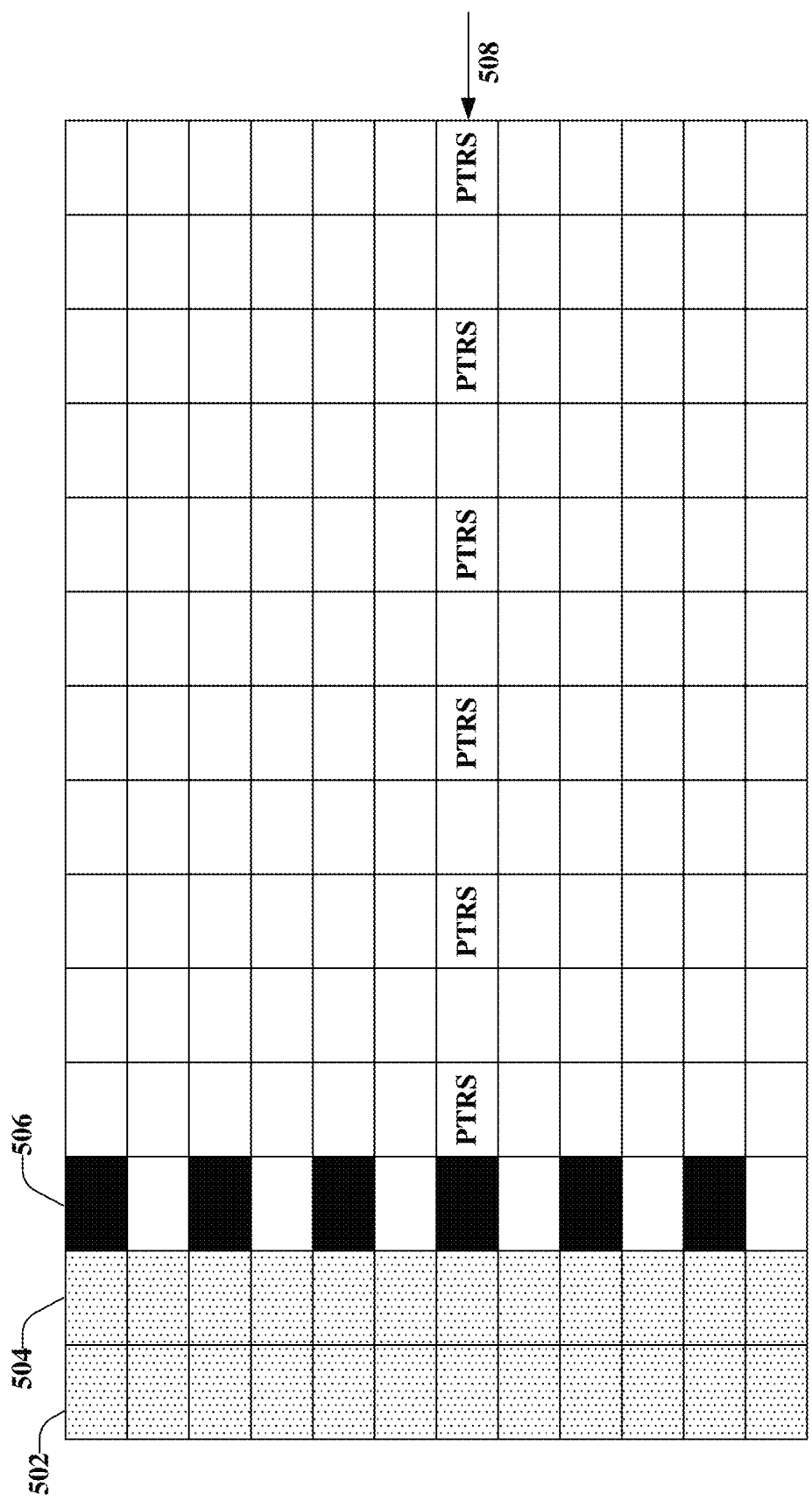
FIG. 5 illustrates an example, non-limiting, resource mapping for a phase tracking reference structure for one resource block.

FIG. 5 illustrates an example, non-limiting, resource mapping for a phase tracking reference structure for one resource block. Similar to the above figures, the first two OFDM symbols are control symbols (indicated by columns 502 and 504). Further, column 506 indicates the resource elements for transmitting DMRS reference symbols.

As illustrated, a single port is utilized for transmitting Phase Tracking Reference Structure (PTRS), as indicated at 508. A single port is the minimum DMRS port index as signaled in the DCI. It is noted that the same structure is repeated for every two resource blocks, as illustrated. However, the same structure can be repeated for every two resource blocks or four resource blocks, depending on the allocated resource blocks as signaled in the downlink control channel.

Table 4 below illustrates an example, non-limiting, time density of PT-RS as a function of scheduled MCS.

TABLE 4

| Scheduled MCS | Time density ($L_{PT-RS}$) |
| --- | --- |
| $I_{MCS}$ < ptrs-MCS$_1$ | PT-RS is not present |
| ptrs-MCS1 ≤ $I_{MCS}$ < ptrs-MCS2 | 4 |
| ptrs-MCS2 ≤ $I_{MCS}$ < ptrs-MCS3 | 2 |
| ptrs-MCS3 ≤ $I_{MCS}$ < ptrs-MCS4 | 1 |

Table 5 below illustrates an example, non-limiting, frequency density of PT-RS as a function of scheduled MCS.

TABLE 5

| Scheduled bandwidth | Frequency density ($K_{PT-RS}$) |
| --- | --- |
| $N_{RB}$ < $N_{RB0}$ | PT-RS is not present |
| $N_{RB0}$ ≤ $N_{RB}$ < $N_{RB1}$ | 2 |
| $N_{RB1}$ ≤ $N_{RB}$ | 4 |

Figure 6:
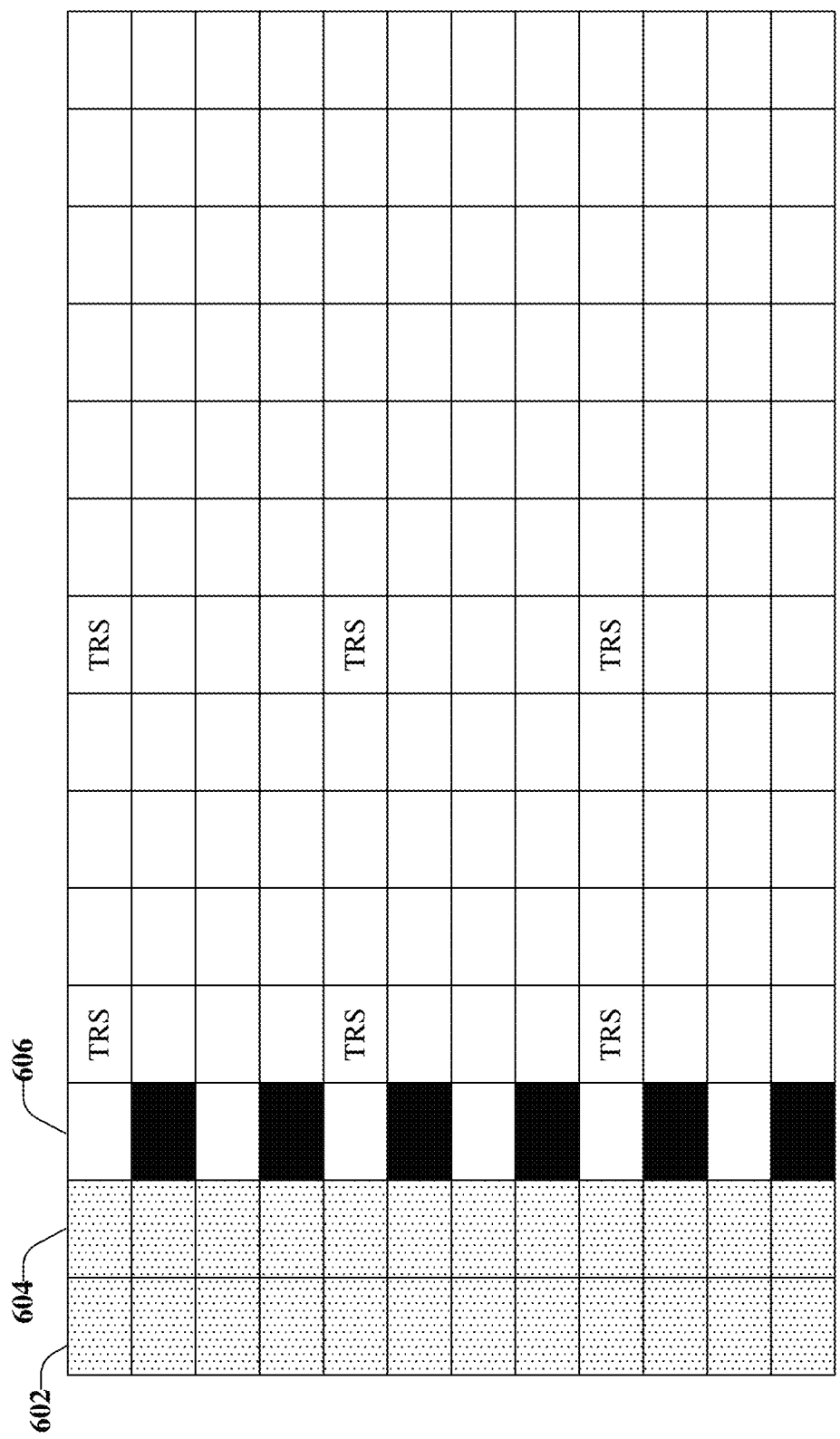
FIG. 6 illustrates an example, non-limiting, resource mapping for tracking reference signals.

FIG. 6 illustrates an example, non-limiting, resource mapping for tracking reference signals. Similar to the above figures, the first two OFDM symbols are control symbols (indicated by columns 602 and 604). Further, column 606 indicates the resource elements for transmitting DMRS reference symbols.

Due to oscillator imperfections, the device should track and compensate for variations in time and frequency to successfully receive downlink transmissions. To assist the device in this task, a tracking reference signal (TRS) can be configured in NR. The TRS is not a CSI-RS. Instead, a TRS is a resource set consisting of multiple periodic CSI-RS with non zero power. More specifically, a TRS includes four one-port, density 3 CSI-RS located within two consecutive slots as depicted in FIG. 6.

The TRS periodicity can be configured with a periodicity of either with 10, 20, 40, or 80 millisecond (msec). Note that the exact set of resource elements used for TRS can vary. There can always be a four-symbol time-domain separation between the two TRS within a slot. This time domain separation sets the limit for frequency error that can be tracked. In a similar manner, the frequency domain separation (four subcarriers) sets the limit for the timing error that can be tracked.

For carrier frequencies less than 6 GHz, the network (e.g., the network device 202) can configure four periodic TRS in two consecutive slots with two periodic TRS resources in each slot. For carrier frequencies greater than 6 GHz, the network can configure two periodic TRS in one slot or with four periodic TRS in two consecutive slots with two periodic TRS resources in each slot.

Figure 7:
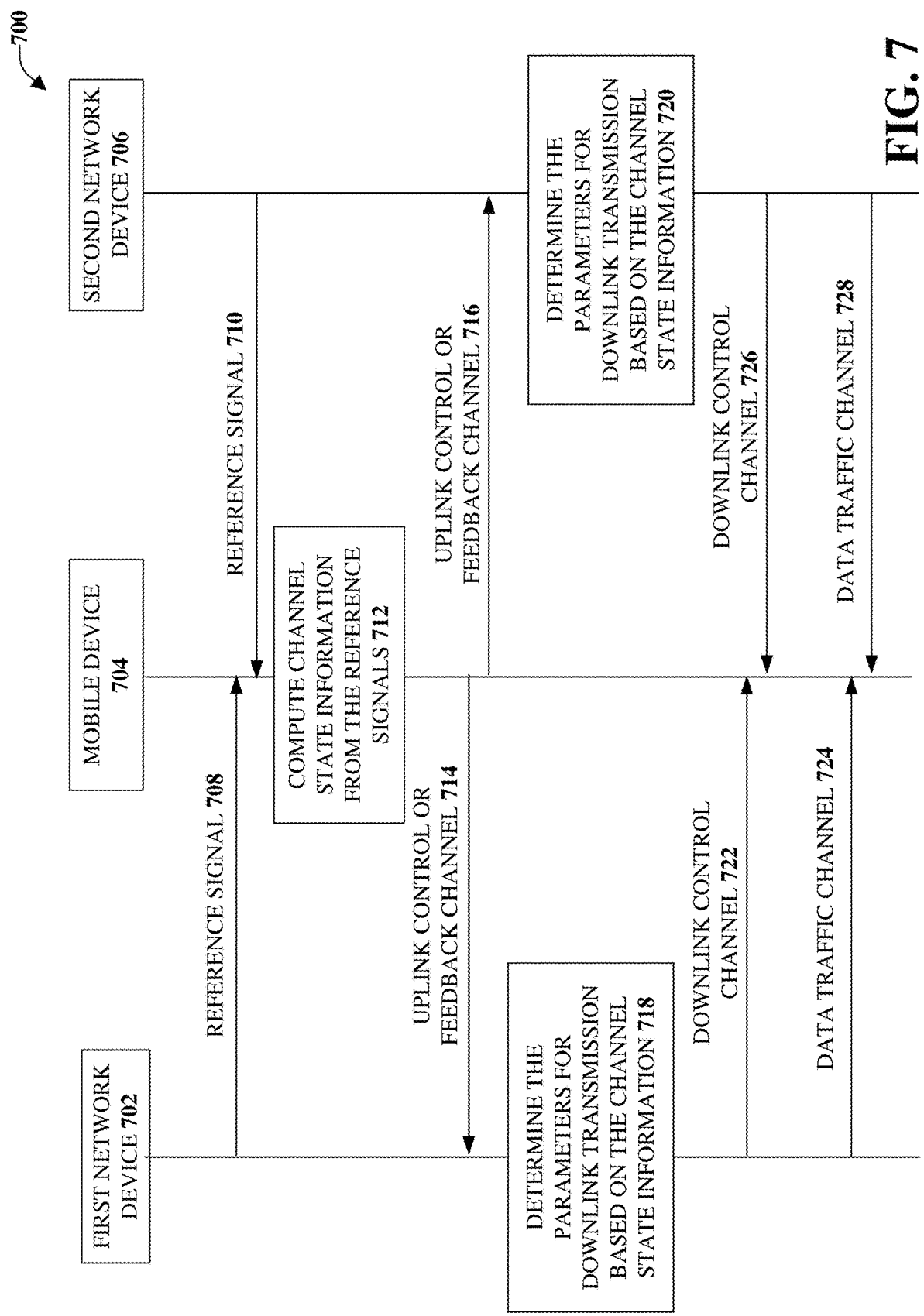
FIG. 7 illustrates an example, non-limiting, message sequence flow chart for downlink data transfer in advanced networks with multiple transmission points in accordance with one or more embodiments described herein.

FIG. 7 illustrates an example, non-limiting, message sequence flow chart 700 for downlink data transfer in advanced networks with multiple transmission points in accordance with one or more embodiments described herein. The message sequence flow chart 700 can be utilized for new radio, as discussed herein. As illustrated, the message sequence flow chart 700 represents the message sequence between a first network device 702 (e.g., a first General Node B, or gNB1), a mobile device 704, and a second network device 706 (e.g., a second gNB or gNB2).

One or more pilot signals and/or reference signals 708 can be transmitted from the first network device 702 to the mobile device 704. Further, one or more pilot signals and/or reference signals 710 can be transmitted from the second network device 706 to the mobile device 704. The one or more pilot signals and/or reference signals 708 and/or the one or more pilot signals and/or reference signals 710 can be cell specific and/or user equipment specific signals. The one or more pilot signals and/or reference signals 708 and/or the one or more pilot signals and/or reference signals 710 can be beamformed or non-beamformed.

Based on the one or more pilot signals and/or reference signals 708 and/or the one or more pilot signals and/or reference signals 710, the mobile device 704 can compute the channel estimates and can compute the one or more parameters needed for channel state information (CSI) reporting, as indicated at 712. The CSI report can be sent from the mobile device 704 to the first network device 702 via a first feedback channel (e.g., a first uplink control or first feedback channel 714). The CSI report (or a different CSI report) can be sent from the mobile device 704 to the second network device 706 via a second first feedback channel (e.g., a second uplink control or second feedback channel 716). The CSI reports can be sent on request from the first network device 702 and/or the second network device 706, a-periodically, and/or the mobile device 704 can be configured to report periodically.

The first network device 702, which can comprise a scheduler, can use the CSI report for determining the parameters for scheduling of the particular mobile device 704. For example, as indicated at 718, the first network device 702, can determine the parameters for downlink transmission based on the channel state information. The parameters for downlink transmission can include but are not limited to: Modulation and Coding Scheme (MCS), power, Physical Resource Blocks (PRBs), and so on.

In addition, the second network device 706, which can comprise a scheduler, can use the CSI report for determining the parameters for scheduling of the particular mobile device 704. For example, as indicated at 720, the second network device 706, can determine the parameters for downlink transmission based on the channel state information. The parameters for downlink transmission can include but are not limited to: MCS, power, PRBs, and so on.

The first network device 702 can send the determined scheduling parameters to the mobile device 704 in a downlink control channel (e.g., downlink control channel 722). Upon or after the scheduling parameter information is transmitted, the actual data transfer can take place from the first network device 702 to the mobile device 704 over a data traffic channel 724 (PDSCH).

In addition, the second network device 706 can send the determined scheduling parameters to the mobile device 704 in a downlink control channel (e.g., downlink control channel 726). Upon or after the scheduling parameter information is transmitted, the actual data transfer can take place from the second network device 706 to the mobile device 704 over a data traffic channel 728 (PDSCH).

When a mobile device (e.g., UE) is configured with multiple Transmission Points (TRP), the channel estimation performance of the primary cell (primary TRP or for example, the first network device 702) is impacted due to the interference in the adjacent cell (secondary cell or, for example, the second network device 706). This is mainly because the adjacent TRP also uses the same resources as that of the primary cell. Channel estimation is important for the performance of the wireless communication and the disclosed aspects can improve the channel estimation, thereby improving the link and system throughput.

Methods that can be implemented in accordance with the disclosed subject matter, will be better appreciated with reference to the following flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 8:
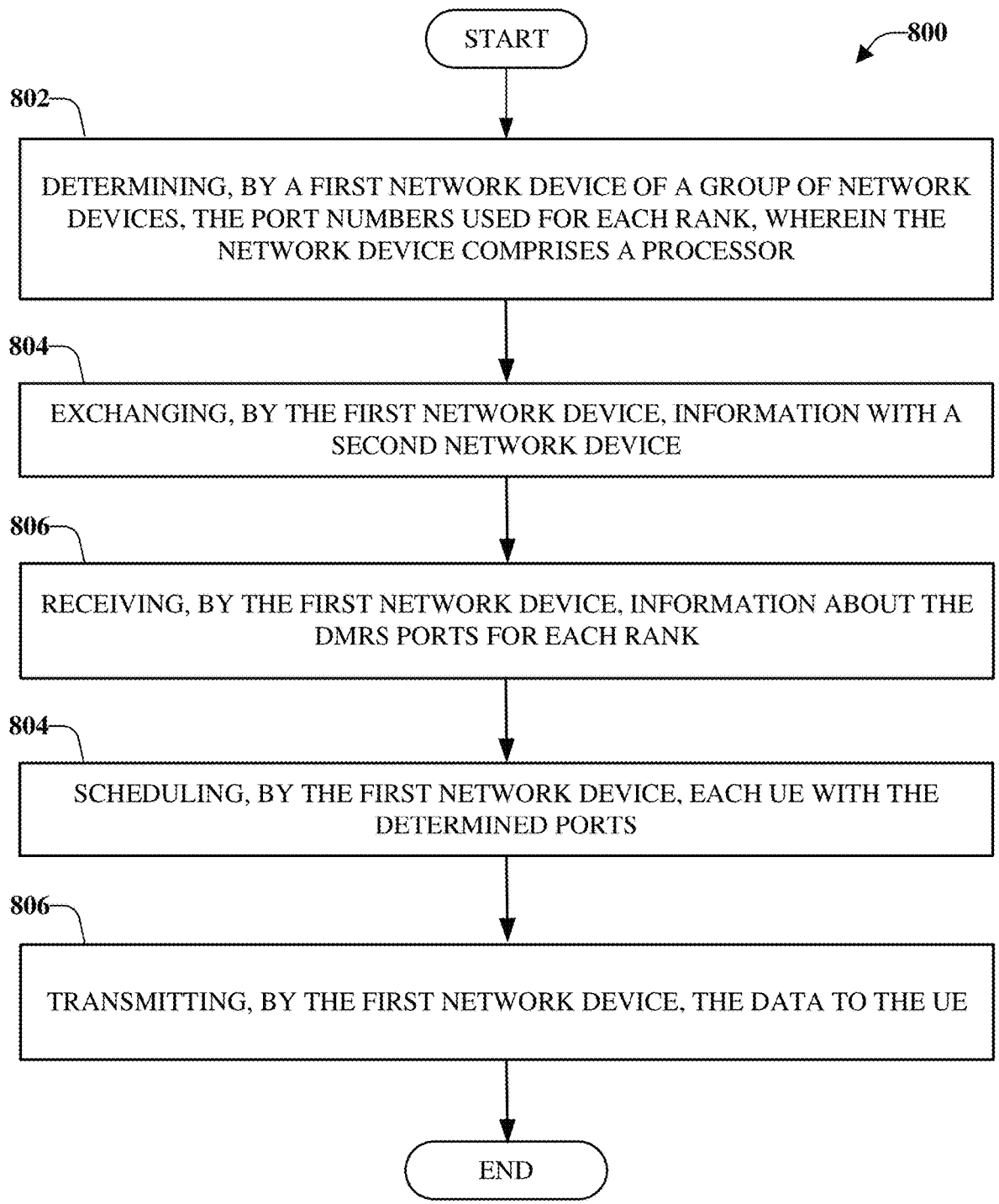
FIG. 8 illustrates a flow diagram of an example, non-limiting, computer-implemented method for semi-static coordination between multiple transmission points for advanced networks in accordance with one or more embodiments described herein.

FIG. 8 illustrates a flow diagram of an example, non-limiting, computer-implemented method 800 for semi-static coordination between multiple transmission points for advanced networks in accordance with one or more embodiments described herein. Repetitive description of like elements employed in other embodiments described herein is omitted for sake of brevity.

In some implementations, a system comprising a processor can perform the computer-implemented method 800 and/or other methods discussed herein. In other implementations, a device comprising a processor can perform the computer-implemented method 800 and/or other methods discussed herein. In other implementations, a machine-readable storage medium, can comprise executable instructions that, when executed by a processor, facilitate performance of operations, which can be the operations discussed with respect to the computer-implemented method 800 and/or other methods discussed herein. In further implementations, a computer readable storage device comprising executable instructions that, in response to execution, cause a system comprising a processor to perform operations, which can be operations discussed with respect to the computer-implemented method 800 and/or other methods discussed herein.

At 802 of the computer-implemented method 800, the port numbers used for each rank can be determined by a first network device (e.g., a primary network device). According to some implementations, determining the port numbers used for each rank can comprise partitioning the available ports into two groups of ports. Information can be exchanged, at 804 of the computer-implemented method 800, with a second network device.

Information about the DMRS ports for each rank can be received by the first network device at 806 of the computer-implemented method 800. Further, at 808, the first network device can schedule each UE with the determined port. Data can be transmitted to the UE, by the first network device, at 810 of the computer-implemented method 800.

The computer-implemented method 800 can facilitate semi-static coordination between the TRPs such that interference on DMRS symbols is minimized and/or reduced. As discussed herein the two TRPs (e.g., first network device, second network device) can pre-determine the port numbers to be used for each rank. For example, the two (or more) TRPs can partition the available DMRS ports such that the interference is minimized and/or reduced. In addition, the TRPs can agree that the PDSCH is not scheduled on the resource elements of the other TRP (e.g., to avoid interference).

Advantages of the disclosed aspects include, but are not limited to, significantly improved channel estimation performance since there is no interference between the adjacent TRPs. This in turn can increase the link and system throughput of the communication system providing huge gains over the traditional techniques. Further, this can result in significant performance improvement for advanced communication systems.

The various aspects discussed herein are directed to a multiple TRP scenario. Semi-static coordination between the TRPs is possible through X2 signaling. The multiple TRPs can exchange information about the maximum rank and the port number for each rank. Based on the exchange of information, the interference on the DMRS can be reduced and/or mitigated to almost zero. The example, non-limiting Table 6 below can be used for Rank 1 transmission for each TRP.

TABLE 6

| Main TRP | | Secondary TRP | |
|---|---|---|---|
| Rank | Ports | Rank | Port |
| 1 | 0 (Index 3 in Table 7.3.1.2.2-1) | 1 | 0 (Index 5 in Table 7.3.1.2.2-1) |
| 1 | 1(Index 4 in Table 7.3.1.2.2-1) | 1 | 1(Index 6 in Table 7.3.1.2.2-1) |

Further, the example, non-limiting, Table 7 below can be used for Rank 2 transmission for each TRP.

TABLE 7

| Main TRP | | Secondary TRP | |
|---|---|---|---|
| Rank | Ports | Rank | Port |
| 2 | 0, 1 (Index 7 in Table 7.3.1.2.2-1) | 2 | 2, 3 (Index 8 in Table 7.3.1.2.2-1) |

It is noted that the indices which indicate CDM groups without data is used. This indicates that when one TRP uses the indices, the other TRP does not schedule data on those resources. Therefore, the interference on the DMRS resource elements can be avoided.

In another embodiment, for rank 1, the number of ports can be allocated based on the load of the system. For example, if a first TRP is experiencing a high traffic load, the first TRP can take a higher number of DMRS ports than the second TRP, thereby load balancing the DMRS allocations.

In another embodiment, the network can use a similar procedure for removing the interference on the other reference signals such as CSI-RS. For example, the network (e.g., a first TRP) can indicate the non zero power CSI-RS allocations to a second TRP, and the second TRP can use ZP-CSI-RS on these resources such that interference is minimized and vice versa. Note that in this case, the network needs to indicate the CSI-RS periodicity to the other TRP.

In another embodiment, a first TRP indicates the PTRS REs to a second TRP, and the second TRP uses zero power CSI-RS on these resources such that interference on PTRS is minimized.

In another embodiment, a first TRP indicates the tracking TRS REs to the second TRP, and the second TRP uses zero power CSI-RS on these resources such that interference on TRS is minimized Note that in this case, the network needs to indicate the TRS periodicity, similar to CSI-RS.

Figure 9:
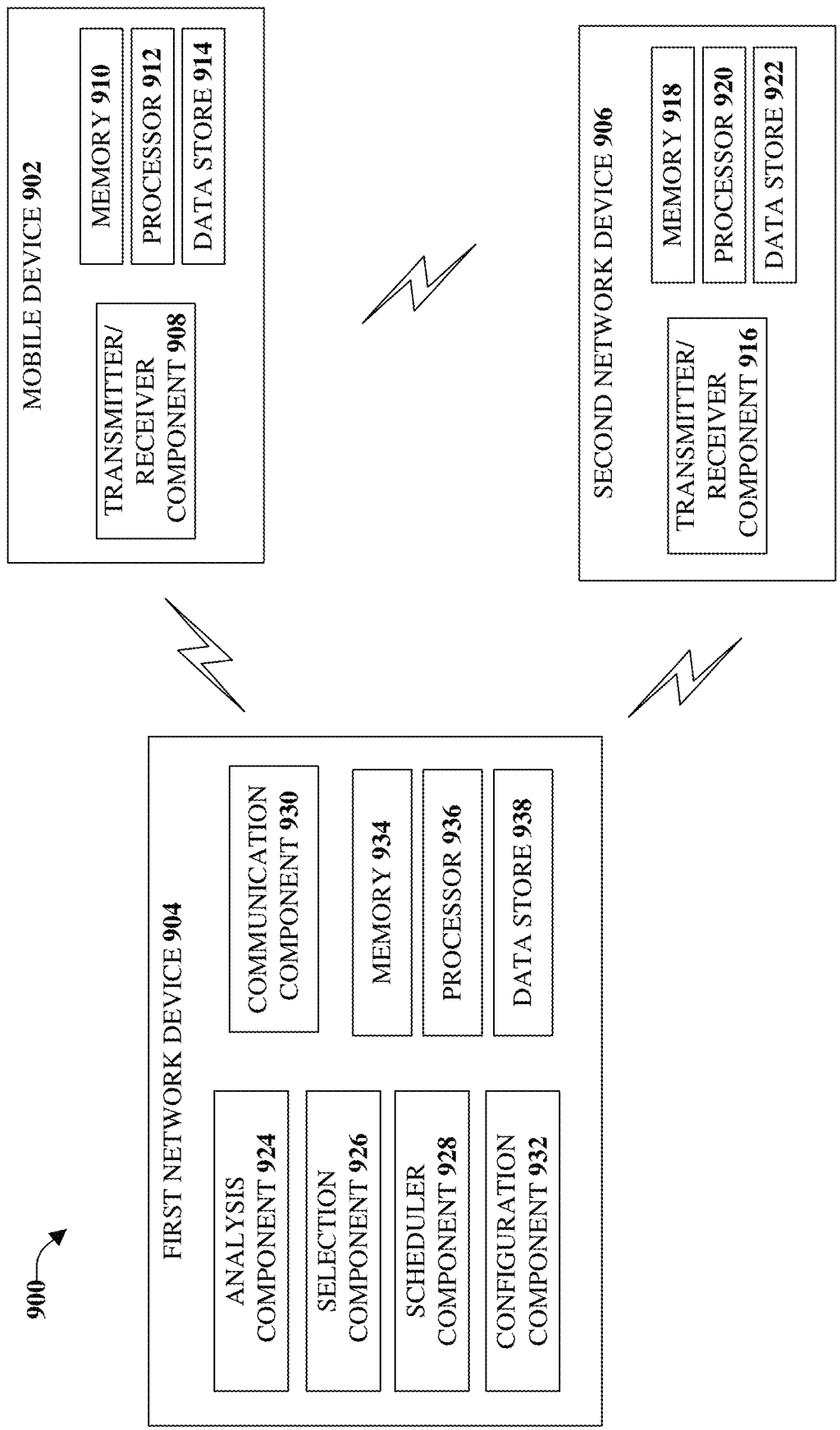
FIG. 9 illustrates an example, non-limiting, system for facilitating improving performance in advanced networks that include multiple transmission points in accordance with one or more embodiments described herein.

FIG. 9 illustrates an example, non-limiting, system 900 for facilitating improving performance in advanced networks that include multiple transmission points in accordance with one or more embodiments described herein. Aspects of systems (e.g., the system 900 and the like), apparatuses, or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the system 900 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 900 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As illustrated in FIG. 9, the system 900 can include a mobile device 902, a first network device 904, and a second network device 906. The first network device 904 can be included in a group of network devices of a wireless network, which can include the second network device 906. Although only a single communication device and two network devices are shown and described, the various aspects are not limited to this implementation. Instead, multiple communication devices and/or multiple network devices can be included in a communications system.

The mobile device 902 can include a transmitter/receiver component 908, at least one memory 910, at least one processor 912, and at least one data store 914. The second network device 906 can include a transmitter/receiver component 916, at least one memory 918, at least one processor 920, and at least one data store 922. Further, the first network device 904 can include an analysis component 924, a selection component 926, a scheduler component 928, a communication component 930, a configuration component 932, at least one memory 934, at least one processor 936, and at least one data store 938.

The analysis component 924 can determine respective port numbers for respective ranks of a first transmission to the mobile device 902. According to some implementations, information indicative of the respective port numbers for the respective ranks of the first transmission to can be transmitted to the second network device 906 (e.g., via the communication component 930).

Further, the communication component 930 can receive, from the second network device 906 (e.g., via the transmitter/receiver component 916), an indication of a first demodulation reference signal associated with a port number for a rank of a second transmission. The second transmission can be a transmission scheduled to be sent to the mobile device 902 from the second network device 906 (e.g., via the transmitter/receiver component 916). For example, the indication can be received via an X2 communication protocol.

The communication component 930 can facilitate a conveyance of the first transmission to the mobile device 902. According to some implementations, the conveyance of the first transmission can be facilitated via a downlink channel configured to operate according to a fifth generation wireless network communication protocol.

In an example, the first transmission can comprise a second demodulation reference signal on a different port number than the port number associated with the second transmission. Thus, the selection component 926 can select the second demodulation reference signal such that the second demodulation reference signal does not interfere with the first demodulation reference signal. For example, the first demodulation reference signal can be located in different resource elements than the second demodulation reference signal.

In accordance with some implementations, the indication from the second network device 906 can comprise information related to a first traffic load of the second network device 906. Thus, the scheduler component 928 can schedule the second demodulation reference signal on the port number based on a difference between the first traffic load of the second network device 906 and a second traffic load of the first network device 904.

According to some implementations, the indication from the second network device 906 can comprise information related to a first group of resource elements associated with a first channel state information reference signal of the second network device 906. Thus, the configuration component 932 can configure a second channel state information reference signal to have zero power at a second group of resource elements that correspond to the first group of resource elements.

The indication from the second network device 906 can comprise information related to a first group of resource elements associated with a first phase tracking reference signal of the second network device 906, according to some implementations. In this case, the configuration component 932 can configure a channel state information reference signal to have zero power at a second group of resource elements that correspond to the first group of resource elements.

The transmitter/receiver component 908 can be configured to transmit to, and/or receive data from, the first network device 904, the second network device 906, other network devices, and/or other mobile devices. Through the transmitter/receiver component 908, the mobile device 902 can concurrently transmit and receive data, can transmit and receive data at different times, or combinations thereof. Further, the transmitter/receiver component 916 can be configured to transmit to, and/or receive data from, the mobile device 902, the first network device 904, other mobile devices, other network devices, and/or other mobile devices. Through the transmitter/receiver component 916, the second network device 906 can concurrently transmit and receive data, can transmit and receive data at different times, or combinations thereof. In addition, the communication component 930 can be configured to transmit to, and/or receive data from, the mobile device 902, the second network device 906, other mobile devices, and/or other network devices. Through the communication component 930, the first network device 904 can concurrently transmit and receive data, can transmit and receive data at different times, or combinations thereof.

The at least one memory 910 can be operatively connected to the at least one processor 912. The at least one memory 910 can store executable instructions that, when executed by the at least one processor 912 can facilitate performance of operations. Further, the at least one processor 912 can be utilized to execute computer executable components stored in the at least one memory 910. In addition, the at least one memory 918 can be operatively connected to the at least one processor 920. The at least one memory 918 can store executable instructions that, when executed by the at least one processor 920 can facilitate performance of operations. Further, the at least one processor 920 can be utilized to execute computer executable components stored in the at least one memory 918.

Further, the at least one memory 934 can be operatively connected to the at least one processor 936. The at least one memory 934 can store executable instructions that, when executed by the at least one processor 936 can facilitate performance of operations. Further, the at least one processor 936 can be utilized to execute computer executable components stored in the at least one memory 934.

For example, the at least one memory 934 can store protocols associated with improved performance in advanced networks with multiple transmission points as discussed herein. Further, the at least one memory 934 can facilitate action to control communication between the first network device 904, the second network device 906, the mobile device 902, other network devices, and/or other mobile devices, such that the first network device 904 can employ stored protocols and/or algorithms to achieve improved communications in a wireless network with multiple transmission points as described herein.

It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 912 can facilitate respective analysis of information related to improved performance in advanced networks with multiple transmission points. The at least one processor 912 can be a processor dedicated to analyzing and/or generating information received, a processor that controls one or more components of the mobile device 902, and/or a processor that both analyzes and generates information received and controls one or more components of the mobile device 902. In addition, the at least one processor 920 can facilitate respective analysis of information related to improved performance in advanced networks with multiple transmission points. The at least one processor 920 can be a processor dedicated to analyzing and/or generating information received, a processor that controls one or more components of the second network device 906, and/or a processor that both analyzes and generates information received and controls one or more components of the second network device 906.

In addition, the at least one processor 936 can facilitate respective analysis of information related to improving performance in advanced networks with multiple transmission points. The at least one processor 936 can be a processor dedicated to analyzing and/or generating information received, a processor that controls one or more components of the first network device 904, and/or a processor that both analyzes and generates information received and controls one or more components of the first network device 904.

Further, the term network device (e.g., network node, network node device) is used herein to refer to any type of network node serving mobile devices and/or connected to other network nodes, network elements, or another network node from which the mobile devices can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes (e.g., network device 804) can include but are not limited to: NodeB devices, base station (BS) devices, access point (AP) devices, and radio access network (RAN) devices. The network nodes can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, a Remote Radio Unit (RRU), a Remote Radio Head (RRH), nodes in distributed antenna system (DAS), and the like.

Figure 10:
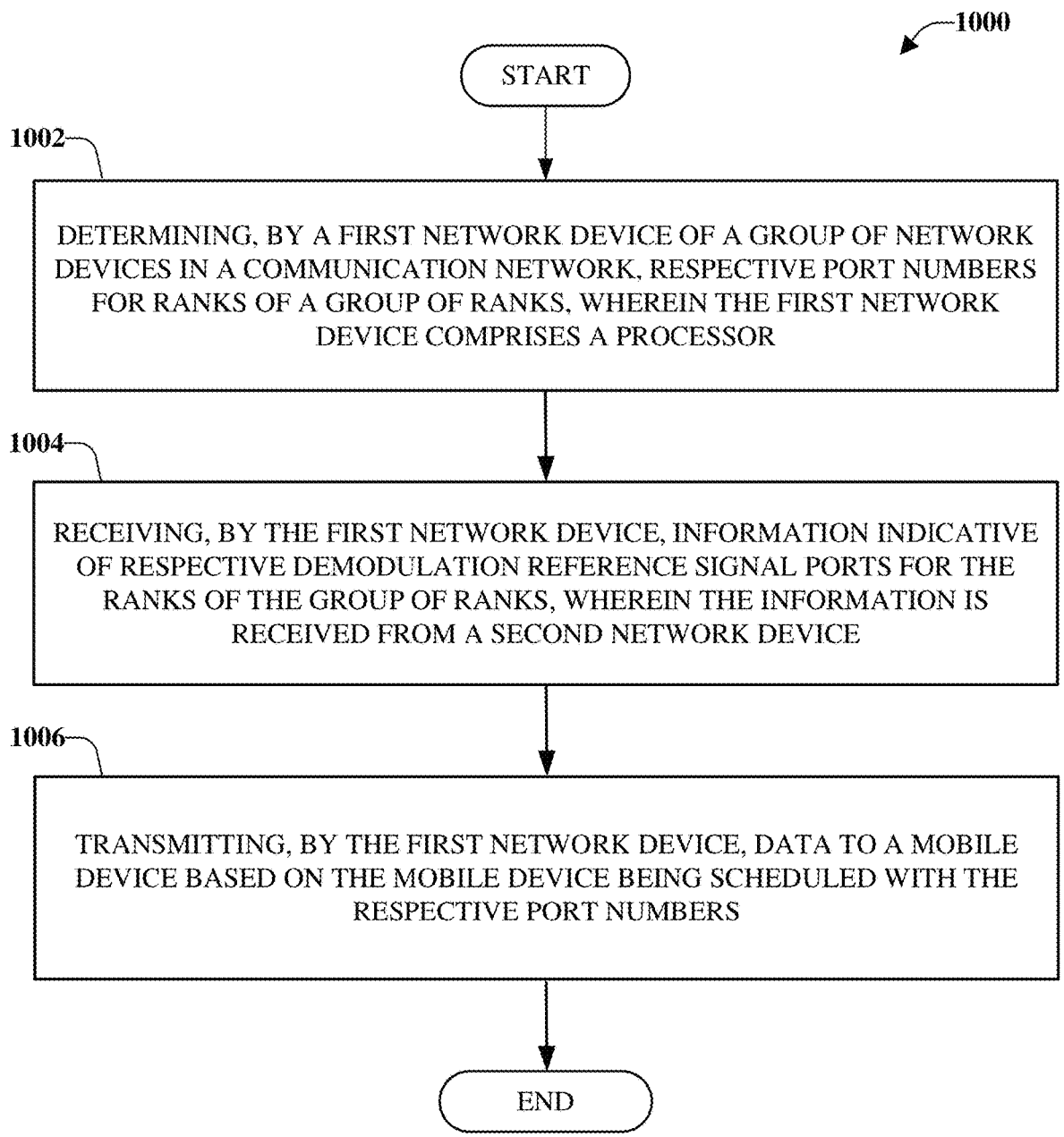
FIG. 10 illustrates a flow diagram of an example, non-limiting, computer-implemented method for facilitating improved performance in advanced networks with multiple transmission points in accordance with one or more embodiments described herein.

FIG. 10 illustrates a flow diagram of an example, non-limiting, computer-implemented method 1000 for facilitating improved performance in advanced networks with multiple transmission points in accordance with one or more embodiments described herein. Repetitive description of like elements employed in other embodiments described herein is omitted for sake of brevity.

In some implementations, a system comprising a processor can perform the computer-implemented method 1000 and/or other methods discussed herein. In other implementations, a device comprising a processor can perform the computer-implemented method 1000 and/or other methods discussed herein. In other implementations, a machine-readable storage medium, can comprise executable instructions that, when executed by a processor, facilitate performance of operations, which can be the operations discussed with respect to the computer-implemented method 1000 and/or other methods discussed herein. In further implementations, a computer readable storage device comprising executable instructions that, in response to execution, cause a system comprising a processor to perform operations, which can be operations discussed with respect to the computer-implemented method 1000 and/or other methods discussed herein.

The computer-implemented method 1000 starts at 1002 when a first network determines respective port numbers for ranks of a group of ranks (e.g., via the analysis component 924). In an example, determining the respective port numbers can comprise partitioning available ports into two groups of ports. According to some implementations, an indication of the respective port numbers for the ranks of the group of ranks can be sent to the second network device.

Further, at 1004 of the computer-implemented method 1000, the first network device can receive information indicative of respective demodulation reference signal ports for the ranks of the group of ranks (e.g., via the communication component 930). The information can be received from a second network device. In some implementations, resource elements of the respective demodulation reference signal ports can be reserved for use by the second network device. Thus, the first network device can avoid scheduling data transmissions on the resource elements of the respective demodulation reference signal ports.

The first network device can transmit, at 1006 of the computer-implemented method 1000, data to a mobile device based on the mobile device being scheduled with the respective port numbers (e.g., via the communication component 930). For example, the mobile device can be scheduled with the respective port numbers for the ranks of the group of ranks. According to some implementations, transmitting the data can comprise transmitting the data via a downlink channel configured to operate according to a fifth generation wireless network communication protocol.

In some implementations, the computer-implemented method can comprise performing, by the first network device, semi-static coordination with transmissions of the second network device. Further to these implementations, the computer-implemented method also can comprise reducing, by the first network device, interference on demodulation reference signals based on performing the semi-static coordination.

Described herein are systems, methods, articles of manufacture, and other embodiments or implementations that can facilitate improved performance in advanced networks with multiple transmission points. Facilitating improved performance in advanced networks with multiple transmission points can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

Cloud Radio Access Networks (RAN) can enable the implementation of concepts such as Software-Defined Network (SDN) and Network Function Virtualization (NFV) in 6G networks. This disclosure can facilitate a generic channel state information framework design for a 6G network. Certain embodiments of this disclosure can comprise an SDN controller that can control routing of traffic within the network and between the network and traffic destinations. The SDN controller can be merged with the 6G network architecture to enable service deliveries via open Application Programming Interfaces (APIs) and move the network core towards an all Internet Protocol (IP), cloud based, and software driven telecommunications network. The SDN controller can work with, or take the place of, Policy and Charging Rules Function (PCRF) network elements so that policies such as quality of service and traffic management and routing can be synchronized and managed end to end.

Figure 11:
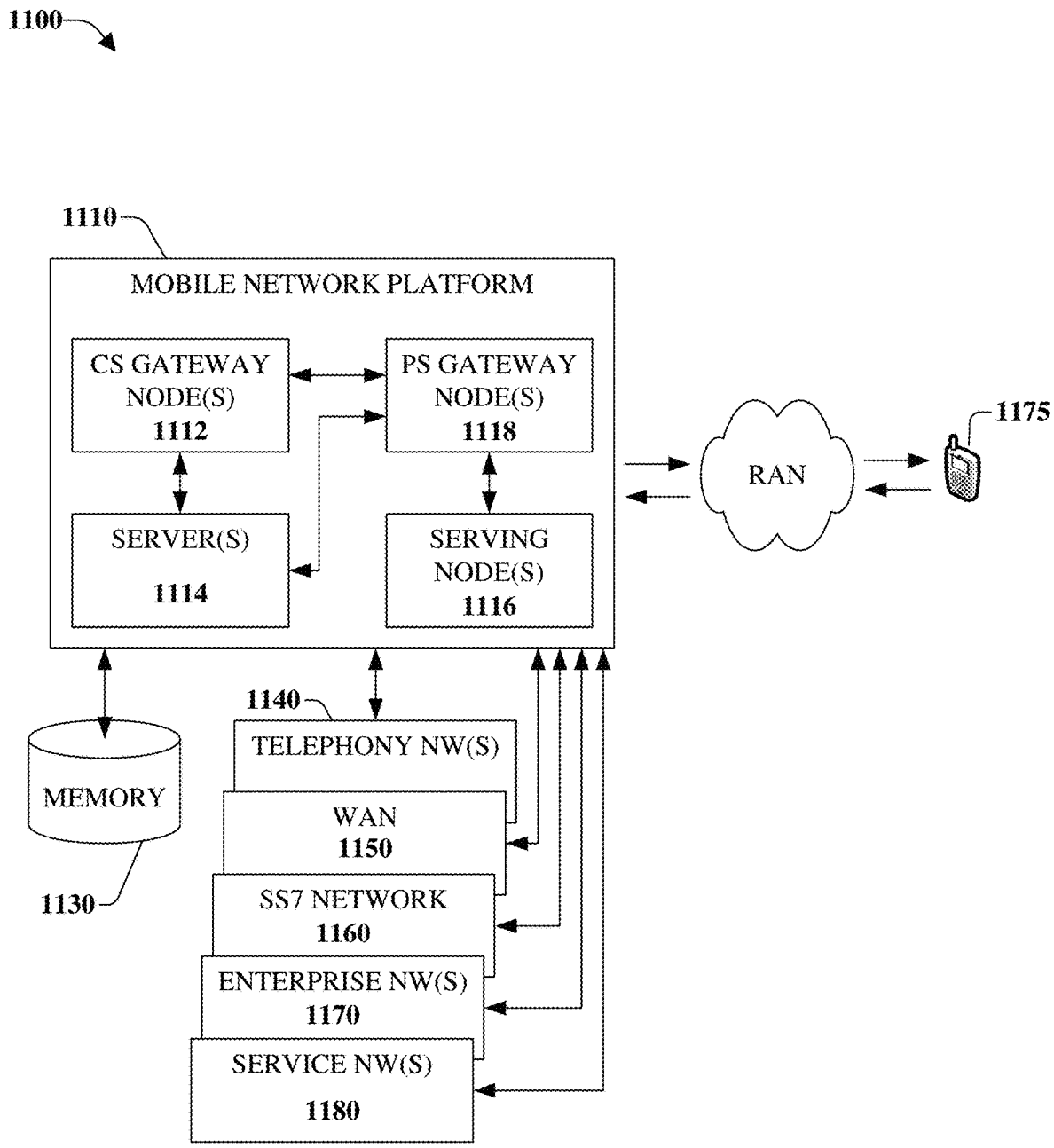
FIG. 11 illustrates an example block diagram of a non-limiting embodiment of a mobile network platform in accordance with various aspects described herein.

FIG. 11 presents an example embodiment 1100 of a mobile network platform 1110 that can implement and exploit one or more aspects of the disclosed subject matter described herein. Generally, wireless network platform 1110 can include components, e.g., nodes, gateways, interfaces, servers, or disparate platforms, that facilitate both packet-switched (PS) (e.g., internet protocol (IP), frame relay, asynchronous transfer mode (ATM) and circuit-switched (CS) traffic (e.g., voice and data), as well as control generation for networked wireless telecommunication. As a non-limiting example, wireless network platform 1110 can be included in telecommunications carrier networks, and can be considered carrier-side components as discussed elsewhere herein. Mobile network platform 1110 includes CS gateway node(s) 1112 which can interface CS traffic received from legacy networks like telephony network(s) 1140 (e.g., public switched telephone network (PSTN), or public land mobile network (PLMN)) or a signaling system #7 (SS7) network 1160. Circuit switched gateway node(s) 1112 can authorize and authenticate traffic (e.g., voice) arising from such networks. Additionally, CS gateway node(s) 1112 can access mobility, or roaming, data generated through SS7 network 1160; for instance, mobility data stored in a visited location register (VLR), which can reside in memory 1130. Moreover, CS gateway node(s) 1112 interfaces CS-based traffic and signaling and PS gateway node(s) 1118. As an example, in a 3GPP UMTS network, CS gateway node(s) 1112 can be realized at least in part in gateway GPRS support node(s) (GGSN). It should be appreciated that functionality and specific operation of CS gateway node(s) 1112, PS gateway node(s) 1118, and serving node(s) 1116, is provided and dictated by radio technology(ies) utilized by mobile network platform 1110 for telecommunication. Mobile network platform 1110 can also include the MMEs, HSS/PCRFs, SGWs, and PGWs disclosed herein.

In addition to receiving and processing CS-switched traffic and signaling, PS gateway node(s) 1118 can authorize and authenticate PS-based data sessions with served mobile devices. Data sessions can include traffic, or content(s), exchanged with networks external to the wireless network platform 1110, like wide area network(s) (WANs) 1150, enterprise network(s) 1170, and service network(s) 1180, which can be embodied in local area network(s) (LANs), can also be interfaced with mobile network platform 1110 through PS gateway node(s) 1118. It is to be noted that WANs 1150 and enterprise network(s) 1170 can embody, at least in part, a service network(s) like IP multimedia subsystem (IMS). Based on radio technology layer(s) available in technology resource(s) 1117, packet-switched gateway node(s) 1118 can generate packet data protocol contexts when a data session is established; other data structures that facilitate routing of packetized data also can be generated. To that end, in an aspect, PS gateway node(s) 1118 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1100, wireless network platform 1110 also includes serving node(s) 1116 that, based upon available radio technology layer(s) within technology resource(s) 1117, convey the various packetized flows of data streams received through PS gateway node(s) 1118. It is to be noted that for technology resource(s) 1117 that rely primarily on CS communication, server node(s) can deliver traffic without reliance on PS gateway node(s) 1118; for example, server node(s) can embody at least in part a mobile switching center. As an example, in a 3GPP UMTS network, serving node(s) 1116 can be embodied in serving GPRS support node(s) (SGSN).

For radio technologies that exploit packetized communication, server(s) 1114 in wireless network platform 1110 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1110. Data streams (e.g., content(s) that are part of a voice call or data session) can be conveyed to PS gateway node(s) 1118 for authorization/authentication and initiation of a data session, and to serving node(s) 1116 for communication thereafter. In addition to application server, server(s) 1114 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1110 to ensure network's operation and data integrity in addition to authorization and authentication procedures that CS gateway node(s) 1112 and PS gateway node(s) 1118 can enact. Moreover, provisioning server(s) can provision services from external network(s) like networks operated by a disparate service provider; for instance, WAN 1150 or Global Positioning System (GPS) network(s) (not shown). Provisioning server(s) can also provision coverage through networks associated to wireless network platform 1110 (e.g., deployed and operated by the same service provider), such as femto-cell network(s) (not shown) that enhance wireless service coverage within indoor confined spaces and offload RAN resources in order to enhance subscriber service experience within a home or business environment by way of UE 1175.

It is to be noted that server(s) 1114 can include one or more processors configured to confer at least in part the functionality of macro network platform 1110. To that end, the one or more processor can execute code instructions stored in memory 1130, for example. It is should be appreciated that server(s) 1114 can include a content manager 1115, which operates in substantially the same manner as described hereinbefore.

In example embodiment 1100, memory 1130 can store information related to operation of wireless network platform 1110. Other operational information can include provisioning information of mobile devices served through wireless network platform network 1110, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1130 can also store information from at least one of telephony network(s) 1140, WAN 1150, enterprise network(s) 1170, or SS7 network 1160. In an aspect, memory 1130 can be, for example, accessed as part of a data store component or as a remotely connected memory store.

Figure 12:
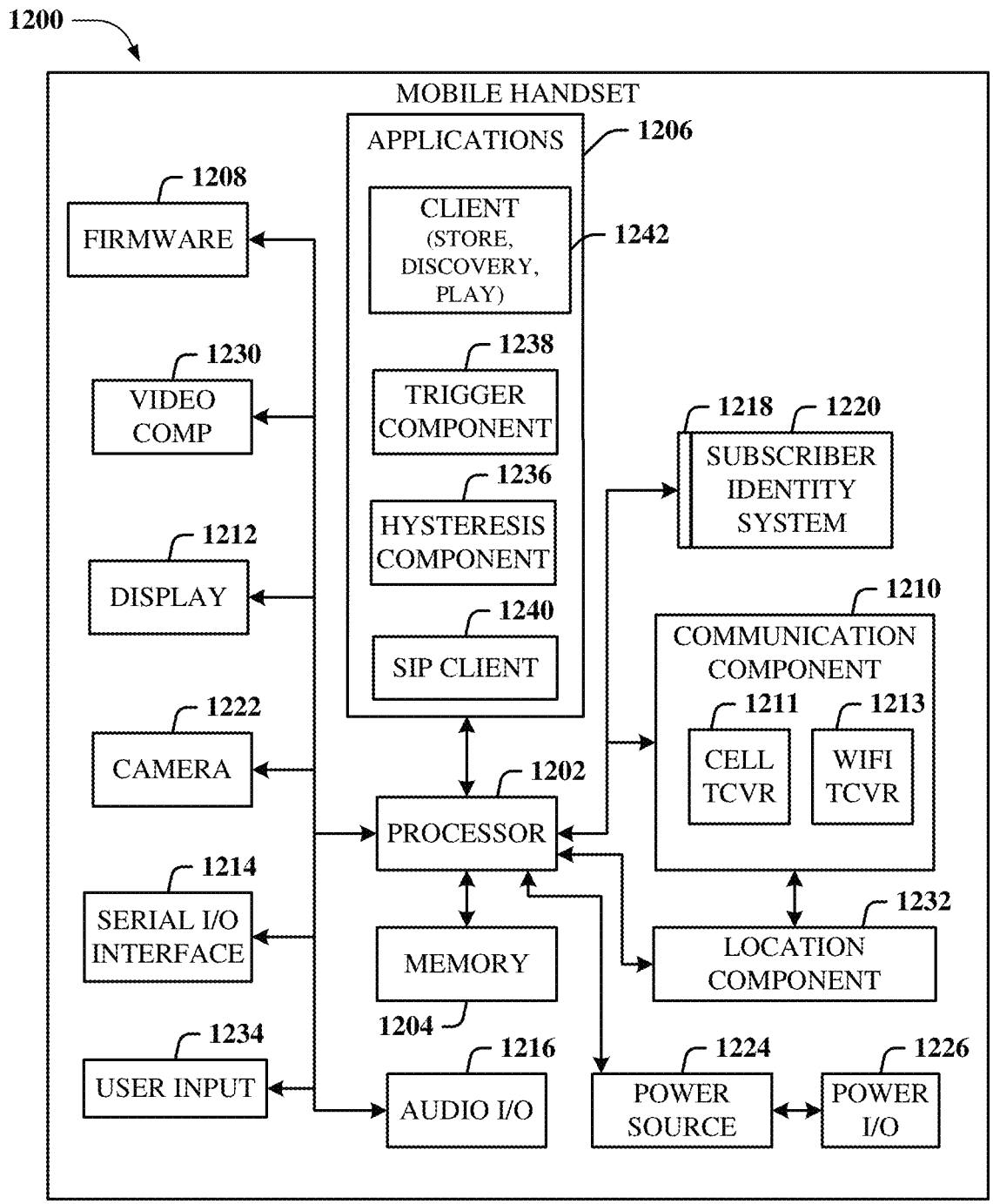
FIG. 12 illustrates an example block diagram of an example mobile handset operable to engage in a system architecture that facilitates wireless communications according to one or more embodiments described herein.

Referring now to FIG. 12, illustrated is an example block diagram of an example mobile handset 1200 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information, and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1202 for controlling and processing all onboard operations and functions. A memory 1204 interfaces to the processor 1202 for storage of data and one or more applications 1206 (e.g., a video player software, user feedback component software, etc.). Other applications can include voice recognition of predetermined voice commands that facilitate initiation of the user feedback signals. The applications 1206 can be stored in the memory 1204 and/or in a firmware 1208, and executed by the processor 1202 from either or both the memory 1204 or/and the firmware 1208. The firmware 1208 can also store startup code for execution in initializing the handset 1200. A communications component 1210 interfaces to the processor 1202 to facilitate wired/wireless communication with external systems, e.g., cellular networks, VoIP networks, and so on. Here, the communications component 1210 can also include a suitable cellular transceiver 1211 (e.g., a GSM transceiver) and/or an unlicensed transceiver 1213 (e.g., Wi-Fi, WiMax) for corresponding signal communications. The handset 1200 can be a device such as a cellular telephone, a PDA with mobile communications capabilities, and messaging-centric devices. The communications component 1210 also facilitates communications reception from terrestrial radio networks (e.g., broadcast), digital satellite radio networks, and Internet-based radio services networks.

The handset 1200 includes a display 1212 for displaying text, images, video, telephony functions (e.g., a Caller ID function), setup functions, and for user input. For example, the display 1212 can also be referred to as a "screen" that can accommodate the presentation of multimedia content (e.g., music metadata, messages, wallpaper, graphics, etc.). The display 1212 can also display videos and can facilitate the generation, editing and sharing of video quotes. A serial I/O interface 1214 is provided in communication with the processor 1202 to facilitate wired and/or wireless serial communications (e.g., USB, and/or IEEE 1394) through a hardwire connection, and other serial input devices (e.g., a keyboard, keypad, and mouse). This can support updating and troubleshooting the handset 1200, for example. Audio capabilities are provided with an audio I/O component 1216, which can include a speaker for the output of audio signals related to, for example, indication that the user pressed the proper key or key combination to initiate the user feedback signal. The audio I/O component 1216 also facilitates the input of audio signals through a microphone to record data and/or telephony voice data, and for inputting voice signals for telephone conversations.

The handset 1200 can include a slot interface 1218 for accommodating a SIC (Subscriber Identity Component) in the form factor of a card Subscriber Identity Module (SIM) or universal SIM 1220, and interfacing the SIM card 1220 with the processor 1202. However, it is to be appreciated that the SIM card 1220 can be manufactured into the handset 1200, and updated by downloading data and software.

The handset 1200 can process IP data traffic through the communications component 1210 to accommodate IP traffic from an IP network such as, for example, the Internet, a corporate intranet, a home network, a person area network, etc., through an ISP or broadband cable provider. Thus, VoIP traffic can be utilized by the handset 1200 and IP-based multimedia content can be received in either an encoded or decoded format.

A video processing component 1222 (e.g., a camera) can be provided for decoding encoded multimedia content. The video processing component 1222 can aid in facilitating the generation, editing, and sharing of video quotes. The handset 1200 also includes a power source 1224 in the form of batteries and/or an AC power subsystem, which power source 1224 can interface to an external power system or charging equipment (not shown) by a power I/O component 1226.

The handset 1200 can also include a video component 1230 for processing video content received and, for recording and transmitting video content. For example, the video component 1230 can facilitate the generation, editing and sharing of video quotes. A location tracking component 1232 facilitates geographically locating the handset 1200. As described hereinabove, this can occur when the user initiates the feedback signal automatically or manually. A user input component 1234 facilitates the user initiating the quality feedback signal. The user input component 1234 can also facilitate the generation, editing and sharing of video quotes. The user input component 1234 can include such conventional input device technologies such as a keypad, keyboard, mouse, stylus pen, and/or touchscreen, for example.

Referring again to the applications 1206, a hysteresis component 1236 facilitates the analysis and processing of hysteresis data, which is utilized to determine when to associate with the access point. A software trigger component 1238 can be provided that facilitates triggering of the hysteresis component 1236 when the Wi-Fi transceiver 1213 detects the beacon of the access point. A SIP client 1240 enables the handset 1200 to support SIP protocols and register the subscriber with the SIP registrar server. The applications 1206 can also include a client 1242 that provides at least the capability of discovery, play and store of multimedia content, for example, music.

The handset 1200, as indicated above related to the communications component 1210, includes an indoor network radio transceiver 1213 (e.g., Wi-Fi transceiver). This function supports the indoor radio link, such as IEEE 802.11, for the dual-mode GSM handset 1200. The handset 1200 can accommodate at least satellite radio services through a handset that can combine wireless voice and digital radio chipsets into a single handheld device.

Figure 13:
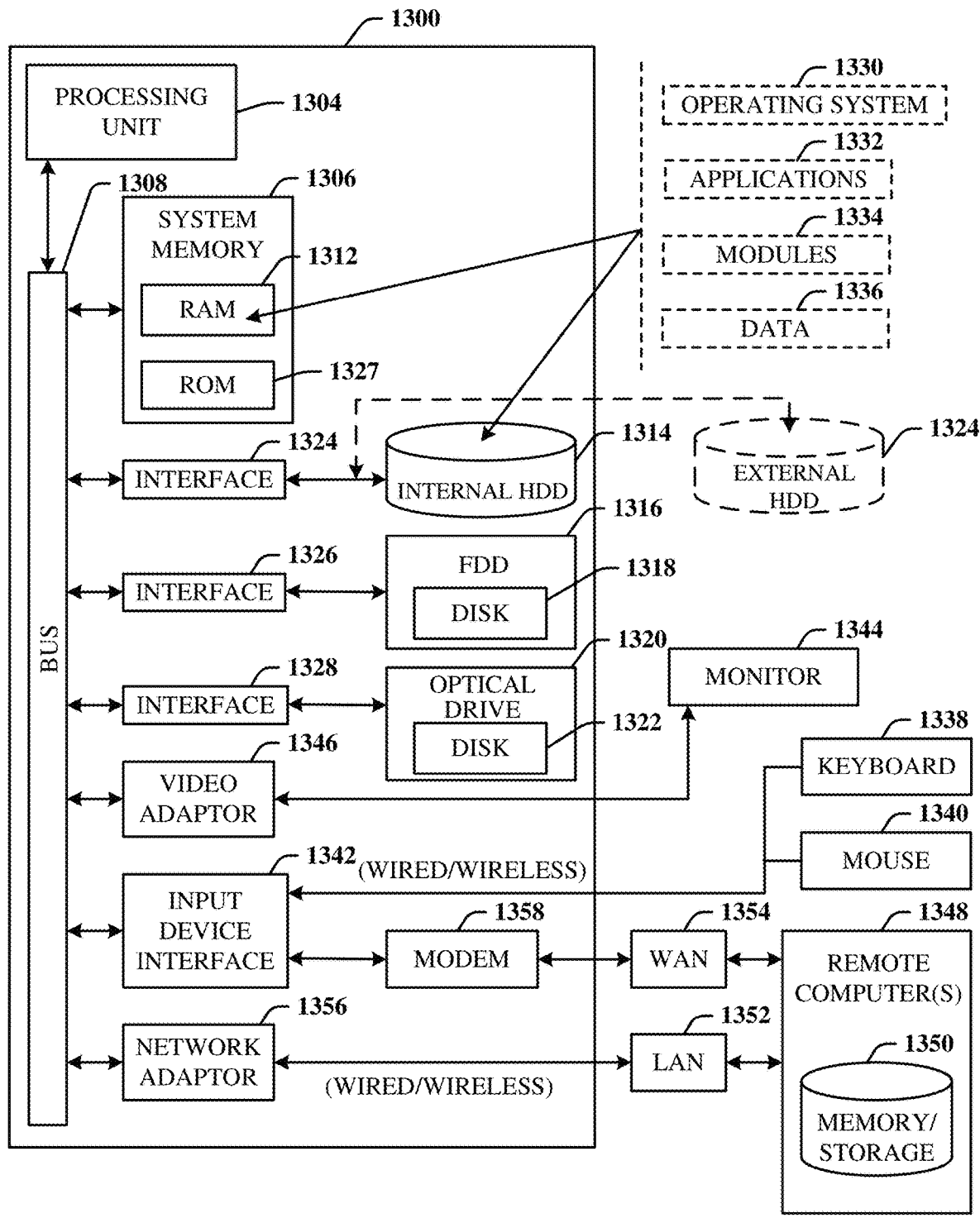
FIG. 13 illustrates an example block diagram of an example computer operable to engage in a system architecture that facilitates wireless communications according to one or more embodiments described herein.

Referring now to FIG. 13, illustrated is an example block diagram of an example computer 1300 operable to engage in a system architecture that facilitates wireless communications according to one or more embodiments described herein. The computer 1300 can provide networking and communication capabilities between a wired or wireless communication network and a server (e.g., Microsoft server) and/or communication device. In order to provide additional context for various aspects thereof, FIG. 13 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 13, implementing various aspects described herein with regards to the end-user device can include a computer 1300, the computer 1300 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes read-only memory (ROM) 1327 and random access memory (RAM) 1312. A basic input/output system (BIOS) is stored in a non-volatile memory 1327 such as ROM, EPROM, EEPROM, which BIOS contains the basic routines that help to transfer information between elements within the computer 1300, such as during start-up. The RAM 1312 can also include a high-speed RAM such as static RAM for caching data.

The computer 1300 further includes an internal hard disk drive (HDD) 1314 (e.g., EIDE, SATA), which internal hard disk drive 1314 can also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1300 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1300, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is to be appreciated that the innovation can be implemented with various commercially available operating systems or combinations of operating systems.

A user can enter commands and information into the computer 1300 through one or more wired/wireless input devices, e.g., a keyboard 1338 and a pointing device, such as a mouse 1340. Other input devices (not shown) can include a microphone, an IR remote control, a joystick, a game pad, a stylus pen, touchscreen, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1344 or other type of display device is also connected to the system bus 1308 through an interface, such as a video adapter 1346. In addition to the monitor 1344, a computer 1300 typically includes other peripheral output devices (not shown), such as speakers, printers, etc.

The computer 1300 can operate in a networked environment using logical connections by wired and/or wireless communications to one or more remote computers, such as a remote computer(s) 1348. The remote computer(s) 1348 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which can connect to a global communications network, e.g., the Internet.

When used in a LAN networking environment, the computer 1300 is connected to the local network 1352 through a wired and/or wireless communication network interface or adapter 1356. The adapter 1356 can facilitate wired or wireless communication to the LAN 1352, which can also include a wireless access point disposed thereon for communicating with the wireless adapter 1356.

When used in a WAN networking environment, the computer 1300 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 through the input device interface 1342. In a networked environment, program modules depicted relative to the computer, or portions thereof, can be stored in the remote memory/storage device 1350. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, and so on), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 6 GHz radio bands, at an 9 Mbps (802.11a) or 64 Mbps (802.11b) data rate, for example, or with products that contain both bands (dual band), so the networks can provide real-world performance similar to the basic 16BaseT wired Ethernet networks used in many offices.

An aspect of 6G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 6G, Universal Mobile Telecommunications System (UMTS), and/or Long Term Evolution (LTE), or other next generation networks, the disclosed aspects are not limited to 6G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 6G systems are desired. As used herein, one or more aspects of a 6G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Systems, methods and/or machine-readable storage media for facilitating a two-stage downlink control channel for 6G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of ⅓ with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. First network equipment, comprising:
   a processor; and
   a memory that stores executable instructions that, when executed by the processor, facilitate performance of operations, comprising:
      determining respective port numbers for respective ranks of a first transmission to a user equipment, wherein the determining comprises partitioning respective indices of the respective port numbers between the first network equipment and second network equipment based on a rank of the respective ranks being determined to be a rank 1 and based on a first network traffic load of the first network equipment and a second network traffic load of the second network equipment;
      exchanging, with the second network equipment, information related to a maximum rank and a port number for each rank;
      receiving an indication, from the second network equipment, of a first demodulation reference signal associated with a first port number for a rank of a second transmission to the user equipment from the second network equipment;
      facilitating a conveyance of the first transmission to the user equipment, wherein the first transmission comprises a second demodulation reference signal on a second port number, different than the first port number associated with the second transmission, and wherein the exchanging comprises determining that the first demodulation reference signal is not scheduled on a first resource element, associated with a first phase tracking reference signal and assigned to the first network equipment and that the second demodulation reference signal is not scheduled on a second resource element, associated with a second phase tracking reference signal different than the first phase tracking reference signal and assigned to the second network equipment, and wherein the first phase tracking reference signal and the second phase tracking reference signal are configured to track respective phase variations across respective durations of the first transmission and the second transmission; and
      performing semi-static coordination with transmissions of the second network equipment, wherein the performing comprises sending, to the second network equipment, indications of tracking reference signal (TRS) resource elements assigned to the first network equipment, and a periodicity of the TRS.

2. The first network equipment of claim 1, wherein the receiving further comprises receiving the indication via an X2 communication protocol.

3. The first network equipment of claim 1, wherein the second demodulation reference signal is selected not to interfere with the first demodulation reference signal.

4. The first network equipment of claim 1, wherein the operations further comprise:
   transmitting information indicative of the respective port numbers for the respective ranks of the first transmission to the second network equipment.

5. The first network equipment of claim 1, wherein the first demodulation reference signal is located in different resource elements than the second demodulation reference signal.

6. The first network equipment of claim 1, wherein the indication from the second network equipment comprises information related to a first group of resource elements associated with a first channel state information reference signal of the second network equipment, and wherein the operations further comprise:
   configuring a second channel state information reference signal to have zero power at a second group of resource elements that correspond to the first group of resource elements.

7. The first network equipment of claim 1, wherein the indication from the second network equipment comprises information related to a first group of resource elements associated with the second phase tracking reference signal of the second network equipment, and wherein the operations further comprise:
   configuring a channel state information reference signal to have zero power at a second group of resource elements that correspond to the first group of resource elements.

8. The first network equipment of claim 1, wherein the facilitating comprises facilitating the conveyance of the first transmission via a downlink channel configured to operate according to a fifth generation wireless network communication protocol.

9. A method, comprising:
   determining, by first network equipment of a group of network equipment, respective port numbers for ranks of a group of ranks, wherein the first network equipment comprises a processor;
   based on a rank of the group of ranks being a rank 1 and based on a first network traffic load of the first network equipment and a second network traffic load of second network equipment of the group of network equipment, partitioning, by the first network equipment, respective indices of the respective port numbers;

exchanging, by the first network equipment and with the second network equipment, information related to a maximum rank and a port number for each rank;

receiving, by the first network equipment, information indicative of respective demodulation reference signal ports for the ranks of the group of ranks, wherein the information is received from the second network equipment;

reserving, by the first network equipment, first resource elements of the respective demodulation reference signal ports for use by the second network equipment;

scheduling, by the first network equipment, data transmissions on second resource elements of the respective demodulation reference signal ports while avoiding the first resource elements, wherein the second resource elements are associated with phase tracking reference signals;

transmitting, by the first network equipment, data to a mobile device based on the mobile device being scheduled with the respective port numbers, wherein the phase tracking reference signals are configured to monitor phase variations during the transmitting; and facilitating, by the first network equipment, semi-static coordination with transmissions of the second network equipment, wherein the semi-static coordination comprises conveying, to the second network equipment, indications of tracking reference signal (TRS) resource elements assigned to the first network equipment, and a periodicity of the TRS.

10. The method of claim 9, further comprising:

sending, by the first network equipment, an indication of the respective port numbers for the ranks of the group of ranks to the second network equipment.

11. The method of claim 10, further comprising:

reducing, by the first network equipment, interference on demodulation reference signals based on the facilitating the semi-static coordination.

12. The method of claim 9, further comprising:

scheduling, by the first network equipment, the mobile device with the respective port numbers for the ranks of the group of ranks.

13. The method of claim 9, wherein the transmitting comprises transmitting the data via a downlink channel configured to operate according to a fifth generation wireless network communication protocol.

14. The method of claim 9, wherein the semi-static coordination facilitates utilization, by the second network equipment, of zero power channel state information reference signals on tracking reference structure resource elements assigned to the first network equipment.

15. The method of claim 9, wherein the semi-static coordination facilitates utilization, by the second network equipment, of zero power channel state information reference signals.

16. The method of claim 9, further comprising, allocating, by the first network equipment, a number of ports based on a traffic load and load balancing a DMRS allocation, wherein the allocating comprises, based on the first network equipment experiencing a first traffic load that is larger than a second traffic load experienced by the second network equipment, allocating, to the first network equipment, a higher number of DMRS ports as compared to a number of DMRS ports allocated to the second network equipment.

17. A non-transitory machine-readable medium, comprising executable instructions that, when executed by a processor of first network equipment, facilitate performance of operations, comprising:

determining respective port numbers for respective ranks of a first transmission to a user equipment;

based on respective network loads of first network equipment and second network equipment and based on a rank of the respective ranks being a rank 1, partitioning respective indices of the respective port numbers between the first network equipment and the second network equipment;

exchanging, with the second network equipment, information related to a maximum rank and a port number for each rank of the respective ranks;

receiving an indication, from the second network equipment, of a first demodulation reference signal associated with a first port number for a rank of a second transmission to the user equipment;

sending the first transmission to the user equipment, wherein the first transmission comprises a second demodulation reference signal on a second port number, different than the first port number associated with the second transmission, wherein the sending comprises sending data using assigned resource elements other than resource elements assigned to the second network equipment, wherein first phase tracking reference signals of the assigned resource elements are configured to track first phase variations across a first duration of the first transmission, and wherein second phase tracking reference signals of the resource elements assigned to the second network equipment are configured to track second phase variations across a second duration of the second transmission; and performing semi-static coordination with transmissions of the second network equipment, wherein the performing comprises transmitting, to the second network equipment, indications of tracking reference signal (TRS) resource elements assigned to the first network equipment, and a periodicity of the TRS.

18. The non-transitory machine-readable medium of claim 17, wherein the second demodulation reference signal is selected to avoid interference with the first demodulation reference signal.

19. The non-transitory machine-readable medium of claim 18, wherein the first demodulation reference signal is located in different resource elements than the second demodulation reference signal.

20. The non-transitory machine-readable medium of claim 17, wherein the sending comprises sending the first transmission to the user equipment via a downlink channel configured to operate according to a fifth generation wireless network communication protocol.

* * * * *